United States Patent
Inoue

(10) Patent No.: US 9,185,344 B2
(45) Date of Patent: Nov. 10, 2015

(54) TRANSMISSION TERMINAL, COMMUNICATION SYSTEM, AND COMPUTER-READABLE STORAGE MEDIUM

(71) Applicant: Takeru Inoue, Kanagawa (JP)

(72) Inventor: Takeru Inoue, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 173 days.

(21) Appl. No.: 13/968,721

(22) Filed: Aug. 16, 2013

(65) Prior Publication Data

US 2014/0049597 A1 Feb. 20, 2014

(30) Foreign Application Priority Data

Aug. 17, 2012 (JP) ................. 2012-181105

(51) Int. Cl.
| | |
|---|---|
| *H04N 7/15* | (2006.01) |
| *H04L 29/06* | (2006.01) |
| *H04M 3/56* | (2006.01) |
| *H04M 3/38* | (2006.01) |
| *H04M 7/00* | (2006.01) |
| *H04L 12/18* | (2006.01) |

(52) U.S. Cl.
CPC .............. *H04N 7/15* (2013.01); *H04L 12/1822* (2013.01); *H04L 65/1093* (2013.01); *H04L 65/403* (2013.01); *H04M 3/38* (2013.01); *H04M 3/563* (2013.01); *H04M 3/567* (2013.01); *H04M 7/006* (2013.01)

(58) Field of Classification Search
CPC . H04M 3/567; H04L 65/403; H04L 12/1818; H04L 12/1822; H04N 7/152; H04N 7/15
USPC .......... 348/14.08, 14.09; 379/202.01, 202.02; 715/753–758
See application file for complete search history.

(56) References Cited

U.S. PATENT DOCUMENTS

| | | | |
|---|---|---|---|
| 7,814,559 B2 | 10/2010 | Horikiri | |
| 8,218,750 B2* | 7/2012 | Boss et al. | ............... 379/202.01 |
| 2004/0047461 A1* | 3/2004 | Weisman et al. | ........ 379/202.01 |
| 2012/0147127 A1* | 6/2012 | Satterlee et al. | ........... 348/14.08 |
| 2013/0058473 A1* | 3/2013 | De Jong | .................. 379/202.01 |
| 2013/0117373 A1 | 5/2013 | Umehara | |

FOREIGN PATENT DOCUMENTS

| | | |
|---|---|---|
| JP | 07-177482 A | 7/1995 |
| JP | 2006-092242 A | 4/2006 |
| JP | 2012-050063 A | 3/2012 |

* cited by examiner

*Primary Examiner* — Stella L Woo
(74) *Attorney, Agent, or Firm* — Oblon, McClelland, Maier & Neustadt, L.L.P.

(57) ABSTRACT

A transmission terminal is connected to a management device via a network. The transmission terminal includes an acquisition unit configured to acquire a communication state of another transmission terminal from the management device; a selection accepting unit configured to accept a selection of the another transmission terminal from a user to participate in an established session that has been already established for the another transmission terminal; a participation determination unit configured to determine that it is not possible to participate in the established session when the communication state of the another transmission terminal whose selection has been accepted indicates participation restriction; and a communication unit configured not to transmit a participation request to the management device when it is determined that the participation is not possible.

8 Claims, 35 Drawing Sheets

CHANGED QUALITY MANAGEMENT TABLE

| IP ADDRESS OF RELAY DESTINATION TERMINAL | IMAGE QUALITY OF IMAGE DATA TO BE RELAYED (QUALITY OF IMAGE) |
|---|---|
| 1.3.2.4 | HIGH IMAGE QUALITY |
| 1.3.1.3 | LOW IMAGE QUALITY |
| 1.3.2.3 | MODERATE IMAGE QUALITY |
| ... | ... |

RELAY DEVICE MANAGEMENT TABLE

| RELAY DEVICE ID | OPERATING STATE | DATE OF RECEPTION | IP ADDRESS OF RELAY DEVICE | MAXIMUM DATA TRANSMISSION RATE (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.2.2.2 | 10 |
| 111e | ON LINE | | 1.1.1.3 | |

FIG.10

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.11

TERMINAL MANAGEMENT TABLE

| TER-MINAL ID | TERMINAL NAME | OPERATING STATE | COMMUNI-CATION STATE | DATE OF RECEPTION | IP ADDRESS OF TERMINAL |
|---|---|---|---|---|---|
| 01aa | TERMINAL AA, TOKYO OFFICE, JAPAN | ON-LINE (CALL-CAPABLE) | None | 2009.11.10.13:40 | 1.2.1.3 |
| 01ab | TERMINAL AB, TOKYO OFFICE, JAPAN | OFF-LINE | | 2009.11.09.12:00 | 1.2.1.4 |
| ... | ... | ... | ... | ... | ... |
| 01ba | TERMINAL BA, OSAKA OFFICE, JAPAN | ON-LINE (IN A CALL) | Private Calling | 2009.11.10.13:45 | 1.2.2.3 |
| 01bb | TERMINAL BB, OSAKA OFFICE, JAPAN | ON-LINE (IN A CALL) | Private Busy | 2009.11.10.13:50 | 1.2.2.4 |
| ... | ... | ... | ... | ... | ... |
| 01ca | TERMINAL CA, NEW YORK OFFICE, USA | OFF-LINE | | 2009.11.10.12:45 | 1.3.1.3 |
| 01cb | TERMINAL CB, NEW YORK OFFICE, USA | OFF-LINE | | 2009.11.10.13:55 | 1.3.1.4 |
| ... | ... | ... | ... | ... | ... |
| 01da | TERMINAL DA, WASHINGTON OFFICE, USA | ON-LINE (IN A CALL) | Private Busy | 2009.11.08.12:45 | 1.3.2.3 |
| 01db | TERMINAL DB, WASHINGTON OFFICE, USA | ON-LINE (CALL-CAPABLE) | None | 2009.11.10.12:45 | 1.3.2.4 |
| ... | ... | ... | ... | ... | ... |

FIG.12

DESTINATION LIST MANAGEMENT TABLE

| START REQUEST TERMINAL ID | DESTINATION TERMINAL ID |
|---|---|
| 01aa | 01ab, 01ba, 01db, 01dc |
| 01ab | 01aa, 01ca, 01cb |
| 01ba | 01aa, 01ab, 01ca, 01cb, 01da, 01db |
| 01cb | 01aa, 01bb, 01db |
| 01db | 01aa, 01cb, 01da |
| ... | ... |

FIG.13

SESSION MANAGEMENT TABLE

| SESSION ID | RELAY DEVICE ID | START REQUEST TERMINAL ID | DESTINATION TERMINAL ID | DELAY TIME (ms) | DATE OF RECEPTION OF DELAY INFORMATION |
|---|---|---|---|---|---|
| se1 | 111e | 01aa | 01db | 200 | 2009.11.10.14:00 |
| se2 | 111b | 01ba | 01be | 50 | 2009.11.10.14:10 |
| se3 | 111c | 01cd | 01cf | 400 | 2009.11.10.14:20 |
| ... | ... | ... | ... | ... | ... |

FIG.14

QUALITY MANAGEMENT TABLE

| DELAY TIME (ms) | IMAGE QUALITY OF IMAGE DATA (QUALITY OF IMAGE) |
|---|---|
| 0 TO 100 | HIGH IMAGE QUALITY |
| 100 TO 300 | MODERATE IMAGE QUALITY |
| 300 TO 500 | LOW IMAGE QUALITY |
| 500 TO | (INTERRUPTED) |

FIG.15

RELAY DEVICE SELECTION MANAGEMENT TABLE

| TERMINAL ID | RELAY DEVICE ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.16

STATE CHANGE MANAGEMENT TABLE

| CHANGE REQUEST INFORMATION | STATE-BEFORE-CHANGE INFORMATION | CHANGE INFORMATION |
|---|---|---|
| Call | None | Accepted |
| Join | Accepted | Busy |
| | Private Accepted | Private Busy |
| Leave | Busy | None |
| | Private Busy | None |

FIG.17

STATE CHANGE MANAGEMENT TABLE

| CHANGE REQUEST INFORMATION | TERMINAL INFORMATION | STATE-BEFORE-CHANGE INFORMATION | CHANGE INFORMATION |
|---|---|---|---|
| Invite | START REQUEST TERMINAL | None | Calling |
| | DESTINATION TERMINAL | None | Ringing |
| Private Invite | START REQUEST TERMINAL | None | Private Calling |
| | DESTINATION TERMINAL | None | Private Ringing |
| Accept | START REQUEST TERMINAL | Calling | Accepted |
| | | Private Calling | Private Accepted |
| | | Accepted | Accepted |
| | | Private Accepted | Private Accepted |
| | DESTINATION TERMINAL | Ringing | Accepted |
| | | Private Ringing | Private Accepted |

TRANSMISSION TERMINAL, COMMUNICATION SYSTEM, AND COMPUTER-READABLE STORAGE MEDIUM

CROSS-REFERENCE TO RELATED APPLICATION

The present application claims priority to and incorporates by reference the entire contents of Japanese Patent Application No. 2012-181105 filed in Japan on Aug. 17, 2012.

BACKGROUND OF THE INVENTION

1. Field of the Invention

The present invention relates to a transmission terminal, a communication system, and a computer-readable storage medium.

2. Description of the Related Art

In recent years, a telephone call system for performing a television conference through a communication network such as the Internet is becoming commonplace along with requirement for reducing expenses for the business trip and length of the business trip. In such a telephone call system, when a call is started among a plurality of call terminals, image data and audio data are transmitted and/or received to hold a television conference successfully.

In addition, high-quality image data or high-quality audio data can be transmitted and/or received among a plurality of call terminals due to an improved broadband environment in recent years. Accordingly, a state of the other party in the television conference may be easily grasped, so that completeness of communication through conversation may be improved.

Some of the conferences involve transmission/reception of highly confidential data and it is desired to provide a technique to appropriately restrict participants of the conference. As a technique of restricting the participants of the conference, Japanese Patent Application Laid-open No. H7-177482 discloses a technique to restrict participation of a person other than the registered participants by registering the participants before the conference is started for the purpose of restricting the participants of the conference.

However, the technique of Japanese Patent Application Laid-open No. H7-177482 requires an operation, by a user, for registering the participants of the conference in advance, and there is a demand for restricting the participants more easily and appropriately.

Therefore, there is a need to provide a transmission terminal, a communication system, and a computer-readable storage that can limit terminals being able to participate in communication easily and appropriately.

SUMMARY OF THE INVENTION

It is an object of the present invention to at least partially solve the problems in the conventional technology.

According to an embodiment, there is provided a transmission terminal connected to a management device via a network. The transmission terminal includes an acquisition unit configured to acquire a communication state of another transmission terminal from the management device; a selection accepting unit configured to accept a selection of the another transmission terminal from a user to participate in an established session that has been already established for the another transmission terminal; a participation determination unit configured to determine that it is not possible to participate in the established session when the communication state of the another transmission terminal whose selection has been accepted indicates participation restriction; and a communication unit configured not to transmit a participation request to the management device when it is determined that the participation is not possible.

According to another embodiment, there is provided a communication system that includes a management device; and a non-transitory computer-readable storage medium with an executable program stored thereon and executed by a computer connected to the management device via a network. The management device includes a transmission unit configured to transmit a communication state of another computer to the computer. The program instructs the computer to perform acquiring the communication state of the another computer from the management device; accepting a selection of the another computer from a user to participate in an established session that has been already established for the another computer; determining that it is not possible to participate in the established session when the communication state of the another computer whose selection has been accepted indicates participation restriction; and not transmitting a participation request to the management device when it is determined that the participation is not possible.

According to still another embodiment, there is provided a non-transitory computer-readable storage medium with an executable program stored thereon and executed by a computer connected to the management device via a network. The program instructs the computer to perform: acquiring the communication state of the another computer from the management device; accepting a selection of the another computer from a user to participate in an established session that has been already established for the another computer; determining that it is not possible to participate in the established session when the communication state of the another computer whose selection has been accepted indicates participation restriction; and not transmitting a participation request to the management device when it is determined that the participation is not possible.

According to still another embodiment, there is provided a communication system that includes a plurality of terminals including a first terminal, a second terminal, and a third terminal; a start request information acquiring unit configured to acquire start request information for requesting start of a session between the first terminal and the second terminal, the start request information including designation that there is participation restriction of a terminal other than the first terminal and the second terminal with respect to the session; a session management unit configured to establish the session between the first terminal and the second terminal according to the start request information; a participation request information acquiring unit configured to acquire participation request information for requesting participation of the third terminal in the established session that has been already established between the first terminal and the second terminal; and a participation determination unit configured to prohibit the third terminal from participating in the established session in response to the acquisition of the participation request information when the start request information designates the participation restriction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a conceptual diagram illustrating a terminal authentication management table;

FIG. 11 is a conceptual diagram illustrating a terminal management table;

FIG. 12 is a conceptual diagram illustrating a destination list management table;

FIG. 13 is a conceptual diagram illustrating a session management table;

FIG. 14 is a conceptual diagram illustrating a quality management table;

FIG. 15 is a conceptual diagram illustrating a relay device selection management table;

FIG. 16 is a conceptual diagram illustrating a state change management table;

FIG. 17 is a conceptual diagram illustrating the state change management table;

DETAILED DESCRIPTION OF THE PREFERRED EMBODIMENTS

Hereinafter, an embodiment of a transmission terminal, a communication system, and a computer program will be described in detail with reference to the accompanying drawings.

Overall Configuration of Embodiment

Figure 1:
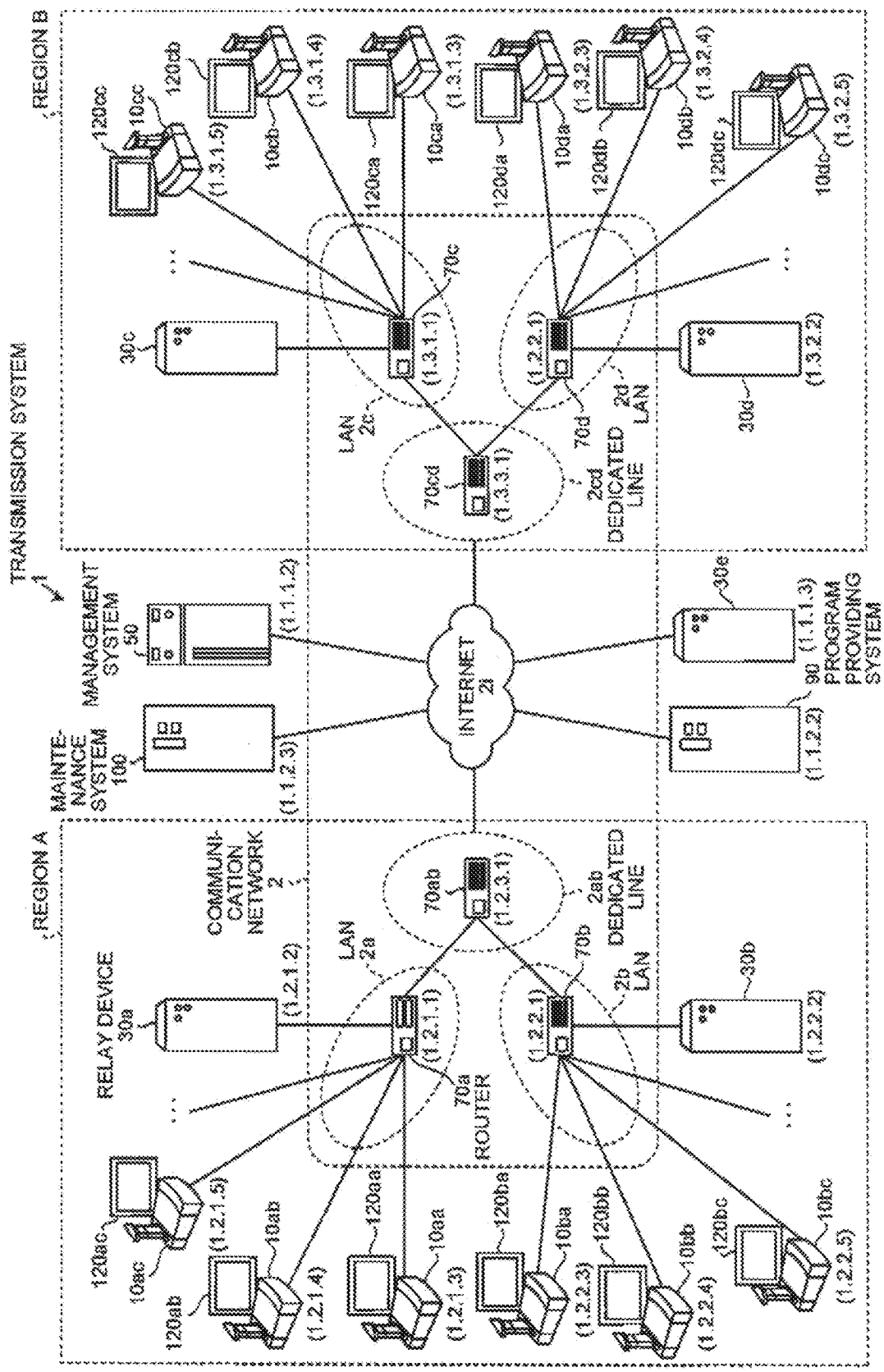
FIG. 1 is a schematic diagram of a transmission system.

Hereinafter, the embodiment of the communication system and the computer program will be described in detail with reference to FIG. 1 to FIG. 39. FIG. 1 is a schematic diagram of a transmission system 1 as a communication system according to the embodiment. First, the embodiment will be schematically described with reference to FIG. 1.

The transmission system 1 includes a data providing system that unidirectionally transmits contents data from one transmission terminal to the other transmission terminal via the transmission management system and a communication system that transfers information or feelings to each other between a plurality of transmission terminals via the transmission management system. The communication system is a system for transferring information or feelings to each other between a plurality of communication terminals (corresponding to the "transmission terminal") via a communication management system (corresponding to the "transmission management system"), and examples thereof include a television conference system, a videophone system, an audio teleconference system, a voice telephony system, a personal computer (PC) screen sharing system, and the like.

On the basis of a television conference system as an example of a communication system, a television conference management system as an example of a communication management system, and a television conference terminal as an example of a communication terminal, the embodiment describes the transmission system 1, transmission management system 50, and a transmission terminal 10. That is, the communication system of the present invention is not only applied to the television conference system but also applied to the communication system or the transmission system.

The transmission system 1 illustrated in FIG. 1 includes a plurality of transmission terminals (10aa, 10ab, . . . ), displays (120aa, 120ab, . . . ) for the transmission terminals (10aa, 10ab, . . . ), a plurality of relay devices (30a, 30b, 30c, 30d, and 30e), the transmission management system 50, a program providing system 90, and a maintenance system 100. Hereinafter, the "transmission terminal" is simply referred to as a "terminal", and the "transmission management system" is simply referred to as a "management system".

In the embodiment, the "transmission terminal 10" represents any of the transmission terminals (10aa, 10ab, . . . ), a "display 120" represents any of the displays (120aa, 120ab, . . . ), and a "relay device 30" represents any of the relay devices (30a, 30b, 30c, 30d, and 30e).

The transmission terminal 10 transmits/receives various pieces of information to/from other devices. For example, the transmission terminal 10 establishes a session with the other terminal 10 and makes a call by transmitting or receiving contents data including audio data and image data in the established session. A television conference among a plurality of terminals 10 can be thus held successfully in the transmission system 1.

Hereinafter, "image data and audio data" is represented as "contents data". The data transmitted between the terminals 10 is not limited to that of the embodiment. For example, the contents data may be text data, and alternatively, the contents data may include text data in addition to the audio data and the image data. The image data may be a moving image or a still image. The image data may include both the moving image and the still image.

In a case where the television conference is started in the transmission system 1 according to the embodiment, a user who desires to start the conference operates a predetermined terminal 10 and the operated terminal 10 transmits start request information to the management system 50.

Herein, the start request information means information to request the start of a session used for the television conference and includes information that designates the terminal 10 as a session partner. Hereinafter, the terminal 10 that transmits the start request information is referred to as a start request terminal. The other terminal 10 designated as a session partner is referred as a destination terminal.

The destination terminal (session partner) may be one terminal 10, and alternatively, may be two or more terminals 10. That is, the transmission system 1 enables a television conference using a session that is established not only between two terminals 10 but also among three or more terminals 10.

In the transmission system 1 according to the embodiment, another user may participate in the television conference, of which session has been already established, that has been started. A user who desires to participate in the conference operates the predetermined terminal 10, and the operated terminal 10 transmits participation request information designating the session being established (hereinafter, referred to as an established session) used in the television conference in which the user desires to participate, to the management system 50. Hereinafter, the terminal 10 that transmits the participation request information is referred to as a participation request terminal.

The management system 50 centrally manages the terminal 10 and the relay device 30. The management system 50 establishes the session among the terminals 10 to hold the television conference successfully through telephone calls or the like among the terminals 10.

When receiving the start request information of the session from the predetermined terminal 10, the management system 50 establishes a session between the terminal 10 (start request terminal) that has transmitted the start request information and the destination terminal, and starts the television conference. In addition, when receiving the participation request information with respect to the session that has been already established (hereinafter, referred to as an established session) from the predetermined terminal 10, the management system 50 determines whether to allow the participation request terminal to participate in the established session.

A plurality of routers (70a, 70b, 70c, 70d, 70ab, and 70cd) illustrated in FIG. 1 select an optimal path for the contents data. In the embodiment, a "router 70" represents any of the routers (70a, 70b, 70c, 70d, 70ab, and 70cd). The relay device 30 relays the contents data among the terminals 10.

The program providing system 90 includes a hard disk (HD) (not illustrated) in which a terminal program for causing the terminal 10 to implement various functions or various units is stored, and may transmit the terminal program to the terminal 10. The HD of the program providing system 90 also stores therein a relay device program for causing the relay device 30 to implement various functions or various units, and may transmit the relay device program to the relay device 30. In addition, the HD of the program providing system 90 stores therein a transmission management program for causing the management system 50 to implement various functions or various units, and may transmit the transmission management program to the management system 50.

The maintenance system 100 is a computer for keeping, managing, or maintaining any one of the terminal 10, the relay device 30, the management system 50, and the program providing system 90. For example, when the maintenance system 100 is domestically set up and the terminal 10, the relay device 30, the management system 50, or the program providing system 90 are set up outside the country, the maintenance system 100 remotely performs, via a communication network 2, maintenance such as keeping, managing, and maintaining any one of the terminal 10, the relay device 30, the management system 50, and the program providing system 90. The maintenance system 100 also performs maintenance such as management of a model number, a serial number, a selling destination, a maintenance checkup, or a trouble history in at least one of the terminal 10, the relay device 30, the management system 50, and the program providing system 90 not via the communication network 2.

The terminals (10aa, 10ab, 10ac, 10a . . . ), the relay device 30a, and the router 70a are communicatably connected by a LAN 2a. The terminals (10ba, 10bb, 10bc, 10b . . . ), the relay device 30b, and the router 70b are communicatably connected by a LAN 2b. The LAN 2a and the LAN 2b are communicatably connected by a dedicated line tab including a router 70ab and constructed in a predetermined region A. For example, the region A is Japan, the LAN 2a is constructed in an office in Tokyo, and the LAN 2b is constructed in an office in Osaka.

The terminals (10ca, 10cb, 10cc, 10c . . . ), the relay device 30c, and the router 70c are communicatably connected by a LAN 2c. The terminals (10da, 10db, 10dc, 10d . . . ), the relay device 30d, and the router 70d are communicatably connected by a LAN 2d. The LAN 2c and the LAN 2d are communicatably connected by a dedicated line 2cd including a router 70cd, and constructed in a predetermined region B. For example, the region B is the United States, the LAN 2c is constructed in an office in New York, and the LAN 2d is constructed in an office in Washington, D.C. The region A and the region B are communicatably connected via the Internet 2i from the routers (70ab and 70cd).

The management system 50 and the program providing system 90 are communicatably connected to the terminal 10 and the relay device 30 via the Internet 2i. The management system 50 and the program providing system 90 may be set up in the region A or the region B, and alternatively, may be set up in the other regions.

The relay device 30e is communicatably connected to the terminal 10 via the Internet 2i. The relay device 30e is in operation all the time and set up in the other regions so as not to be easily influenced by communication traffic volume in a local area such as the region A or the region B. Therefore, when the terminal 10 makes a call to a terminal set up in the other local area, the relay device 30e is used as a relay device for relaying the contents data. In a case where the relay device set up in the local area is not in operation when a call is made between the terminals in the same local area, the relay device 30e is also used as an emergency relay device.

In the embodiment, the communication network 2 according to the embodiment is constructed by the LAN 2a, the LAN 2b, the dedicated line tab, the Internet 2i, the dedicated line 2cd, the LAN 2c, and the LAN 2d. The communication network 2 may include a part where communication is performed wirelessly, in addition to communication in a wired manner.

In FIG. 1, the four sets of numbers illustrated below the terminals 10, the relay devices 30, the management system 50, the routers 70, the program providing system 90, and the maintenance system 100 simply represent an IP address of a typical IPv4. For example, an IP address of the terminal 10aa is "1.2.1.3". Although an IPv6 may be used instead of the IPv4, a description is made by using the IPv4 for the sake of simplicity.

Hardware Configuration of Embodiment

Figure 4:
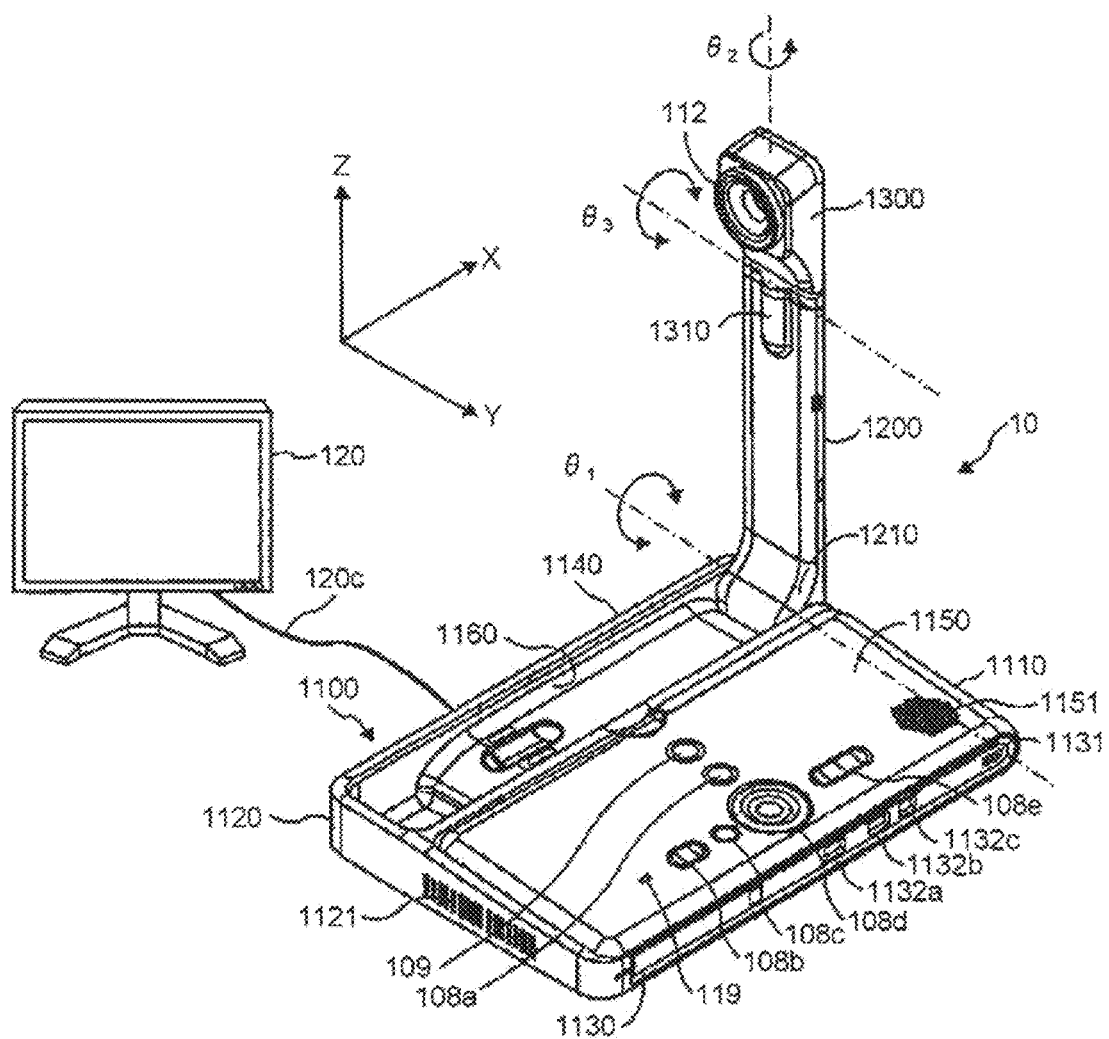
FIG. 4 is an outline drawing of the transmission terminal.

Next, a hardware configuration of the embodiment will be described. FIG. 4 is an outline drawing of the terminal 10. Hereinafter, a description is made assuming that a longitudinal direction of the terminal 10 is an X-axis direction, a direction orthogonal to the X-axis direction in a horizontal plane is a Y-axis direction, and a direction orthogonal to the X-axis direction and the Y-axis direction (vertical direction) is a Z-axis direction.

As illustrated in FIG. 4, the terminal 10 includes a casing 1100, an arm 1200, and a camera housing 1300. Among these, an intake surface (not illustrated) formed by a plurality of intake holes is provided on a front wall surface 1110 of the casing 1100, and an exhaust surface 1121 on which a plurality of exhaust holes are formed is provided on a rear wall surface 1120 of the casing 1100. Accordingly, outside air in the rear of the terminal 10 can be taken in via the intake surface (not illustrated) by driving a cooling fan incorporated in the casing 1100 and be exhausted at the rear of the terminal 10 via the exhaust surface 1121. A sound acquisition hole 1131 is formed on a right-side wall surface 1130 of the casing 1100, so that sound such as voice, loud sound, and noise can be picked up by a built-in microphone 114 to be described later.

An operation panel 1150 is formed on the right-side wall surface 1130 side of the casing 1100. In the operation panel 1150, a plurality of operation buttons (108a to 108e) to be described later, a power switch 109 to be described later, and an alarm lamp 119 to be described later are provided, and a sound emitting surface 1151 is formed, the sound emitting surface 1151 being formed by a plurality of audio output holes through which output sound from a built-in speaker 115 to be described later passes. On a left-side wall surface 1140 side of the casing 1100, an accommodating part 1160 is formed as a recessed part for accommodating the arm 1200 and the camera housing 1300. On the right-side wall surface 1130 of the casing 1100, a plurality of connections (1132a to 1132c) are provided for electrically connecting a cable to an external device connection I/F 118 to be described later. On the left-side wall surface 1140 of the casing 1100, a connection (not illustrated) is provided for electrically connecting a cable 120c for the display 120 to the external device connection I/F 118 to be described later.

Hereinafter, an "operation button 108" represents any of the operation buttons (108a to 108e), and a "connection 1132" represents any of the connections (1132a to 1132c).

Next, the arm 1200 is attached to the casing 1100 via a torque hinge 1210, and is configured such that the arm 1200 can vertically rotate with respect to the casing 1100 within a range of a tilt angle $\theta_1$ of 135 degrees. FIG. 4 illustrates a state where the tilt angle $\theta_1$ is 90 degrees.

A built-in camera 112 to be described later is provided in the camera housing 1300, and images of a user, a document, a room, and the like can be picked up. A torque hinge 1310 is formed in the camera housing 1300. The camera housing 1300 is attached to the arm 1200 via the torque hinge 1310. The camera housing 1300 is attached to the arm 1200 via the torque hinge 1310, and is configured such that the camera housing 1300 can vertically and horizontally rotate with respect to the arm 1200, within a range of a pan angle $\theta_2$ of ±180 degrees and a range of a tilt angle $\theta_3$ of ±45 degrees, assuming that the state illustrated in FIG. 4 is 0 degree.

Alternatively, the terminal 10 may be a typical general purpose computer. When a computer used as the terminal 10 does not have a microphone or a camera, an external microphone and camera are connected to the computer. Accordingly, the general purpose computer may be used as the terminal 10 according to the embodiment. When the general purpose computer is used as the terminal 10, an application for executing a process of the terminal 10 to be described later is installed on the computer.

Appearances of the relay device 30, the management system 50, the program providing system 90, and the maintenance system 100 are the same as that of typical servers or computers, so that the appearances thereof will not be described here.

Figure 2:
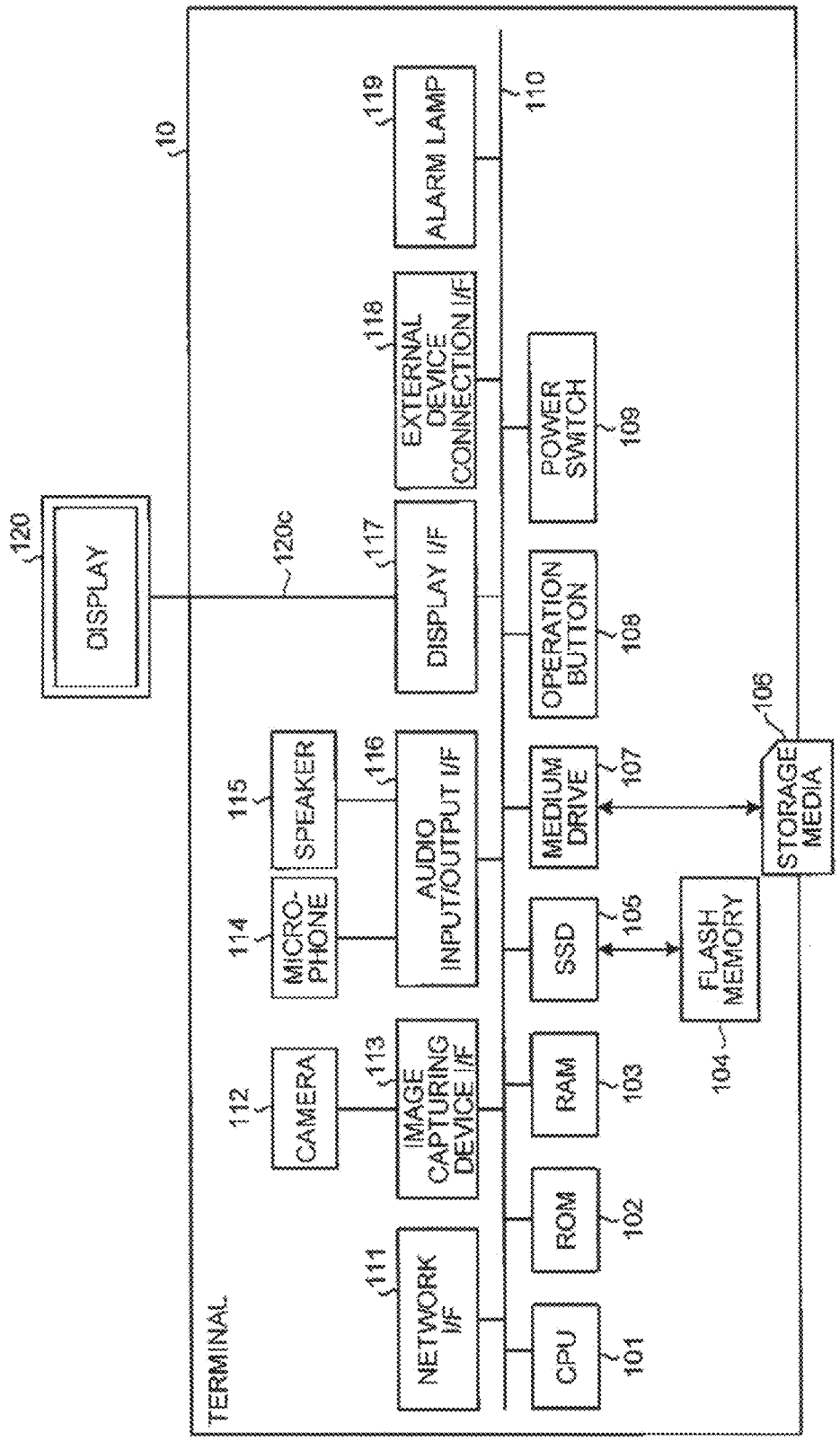
FIG. 2 is a hardware configuration diagram of a transmission terminal.

FIG. 2 is a hardware configuration diagram of the terminal 10 according to the embodiment of the present invention. As illustrated in FIG. 2, the terminal 10 of the embodiment includes a central processing unit (CPU) 101 that controls entire operation of the terminal 10, a read only memory (ROM) 102 storing therein the terminal program, a random access memory (RAM) 103 used as a work area of the CPU 101, a flash memory 104 that stores therein various pieces of data such as image data or audio data, a solid state drive (SSD) 105 that controls reading or writing of various pieces of data with respect to the flash memory 104 under the control of the CPU 101, a media drive 107 that controls reading or writing (storing) of data with respect to a storage medium 106 such as a flash memory, the operation button 108 operated when selecting a destination of the terminal 10, the power switch 109 for switching ON/OFF of a power supply of the terminal 10, and a network interface (I/F) 111 for transmitting data by using the communication network 2 to be described later.

The terminal 10 includes the built-in camera 112 that acquires image data by imaging a subject under the control of the CPU 101, an image capturing device I/F 113 that controls driving of the camera 112, the built-in microphone 114 that inputs a voice, the built-in speaker 115 that outputs a voice, an audio input/output I/F 116 that processes input/output of an audio signal between the microphone 114 and the speaker 115 under the control of the CPU 101, a display I/F 117 that transmits image data to the external display 120 under the control of the CPU 101, the external device connection I/F 118 for connecting various external devices, the alarm lamp 119 that makes a notification of abnormality in various functions of the terminal 10, and a bus line 110 such as an address bus or a data bus for electrically connecting the various components as illustrated in FIG. 2.

The display 120 is a display unit constituted by a liquid crystal or organic EL that displays an image of the subject or a console icon, and the like. The display 120 is also connected to the display I/F 117 by the cable 120c. The cable 120c may be a cable for an analog RGB (VGA) signal, a cable for a component video, or a cable for a High-Definition Multimedia Interface (HDMI) or a Digital Video Interactive (DVI) signal.

The camera 112 includes a lens and a solid image capturing device that electronifies an image (video) of the subject by converting light into a charge, and a complementary metal oxide semiconductor (CMOS) or a charge coupled device (CCD) are used as the solid image capturing device, for example.

An external device such as an external camera, an external microphone, and an external speaker may be electrically connected to the external device connection I/F 118 with a Universal Serial Bus (USB) cable and the like inserted in the connection 1132 of the casing 1100 illustrated in FIG. 4. When the external camera is connected, the external camera is driven in priority to the built-in camera 112 under the control of the CPU 101. Similarly, when the external microphone is connected or when the external speaker is connected, the external microphone or the external speaker are respectively driven in priority to the built-in microphone 114 or the built-in speaker 115 under the control of the CPU 101.

The storage medium 106 is configured to be freely attached/detached to/from the terminal 10. An electrically erasable and programmable ROM (EEPROM) and the like may be used instead of the flash memory 104, as long as it is a nonvolatile memory that reads or writes data under the control of the CPU 101.

The terminal program may be stored as an installable or executable file in a computer-readable storage medium (storage medium 106 and the like) and distributed. The terminal program may be stored in the ROM 102 instead of the flash memory 104.

Figure 3:
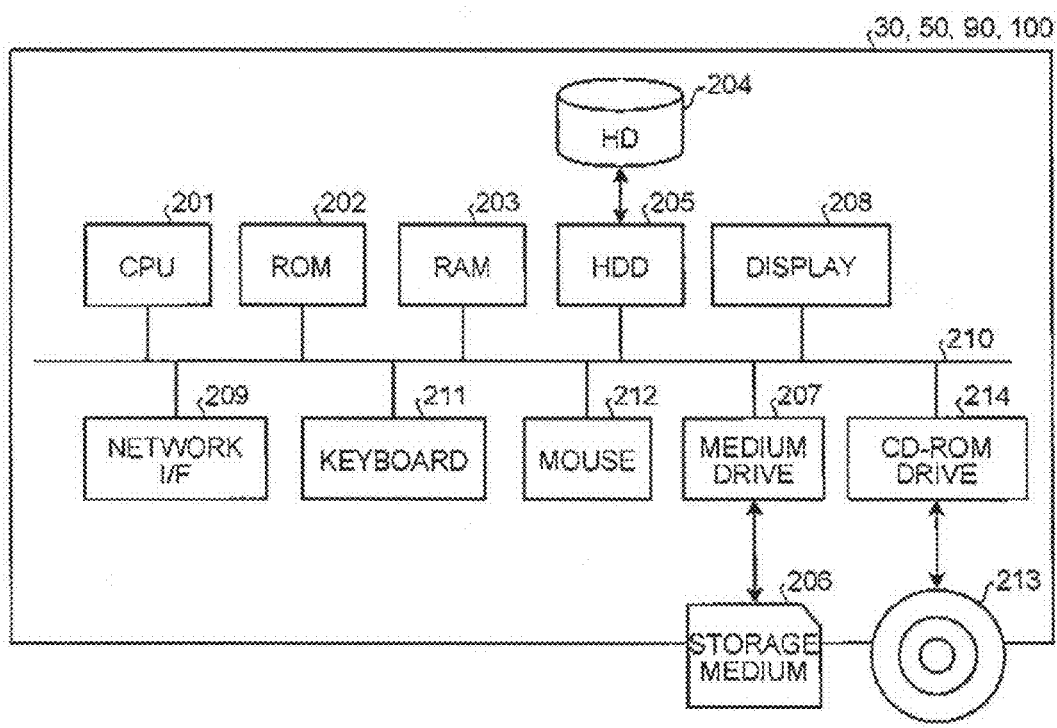
FIG. 3 is a hardware configuration diagram of a transmission management system, a relay device, a program providing system, or a maintenance system.

FIG. 3 is a hardware configuration diagram of the management system according to an embodiment of the present invention. The management system 50 includes a CPU 201 that controls entire operation of the management system 50, a ROM 202 that stores therein the transmission management program, a RAM 203 used as a work area of the CPU 201, a hard disk (HD) 204 that stores various pieces of data, a hard disk drive (HDD) 205 that controls reading or writing of various pieces of data with respect to the HD 204 under the control of the CPU 201, a media drive 207 that controls reading or writing (storing) of data with respect to a storage medium 206 such as a flash memory, a display 208 that displays various pieces of information such as a cursor, a menu, a window, a character, or an image, a network I/F 209 for transmitting data by using the communication network 2 to be described later, a keyboard 211 including a plurality of keys for inputting a character, a numerical value, various instructions, and the like, a mouse 212 that selects or executes various instructions, selects a processing target, and moves the cursor, a CD-ROM drive 214 that controls reading or writing of data with respect to a compact disc read only memory (CD-ROM) 213 as an example of a detachable storage medium, and a bus line 210 such as an address bus or a data bus for electrically connecting the various components as illustrated in FIG. 3.

The transmission management program may be stored in a computer-readable storage medium such as the storage medium 206 or the CD-ROM 213 as an installable or executable file and distributed.

The relay device 30 has a hardware configuration similar to that of the management system 50, so that a description thereof is not repeated here. However, the relay device program for controlling the relay device 30 is stored in the ROM 202. Also in this case, the relay device program may be stored in a computer-readable storage medium such as the storage medium 206 or the CD-ROM 213 as an installable or executable file and distributed.

The program providing system 90 has a hardware configuration similar to that of the management system 50, so that a description thereof is not repeated here. However, a program providing programs for controlling the program providing system 90 is stored in the ROM 202. Also in this case, the program providing program may be stored in a computer-readable storage medium such as the storage medium 206 or the CD-ROM 213 as an installable or executable file and distributed.

The maintenance system 100 has a hardware configuration similar to the management system 50, so that a description thereof is not repeated here. However, a maintenance program for controlling the maintenance system 100 is stored in the ROM 202. Also in this case, the maintenance program may be stored in a computer-readable storage medium such as the storage medium 206 or the CD-ROM 213 as an installable or executable file and distributed.

Alternatively, the program may be stored in a computer-readable storage medium such as a compact disc recordable (CD-R), a digital versatile disk (DVD), and a Blu-ray Disc (trademark) and provided as another example of the detachable storage medium.

Functional Configuration of Embodiment

Figure 5:
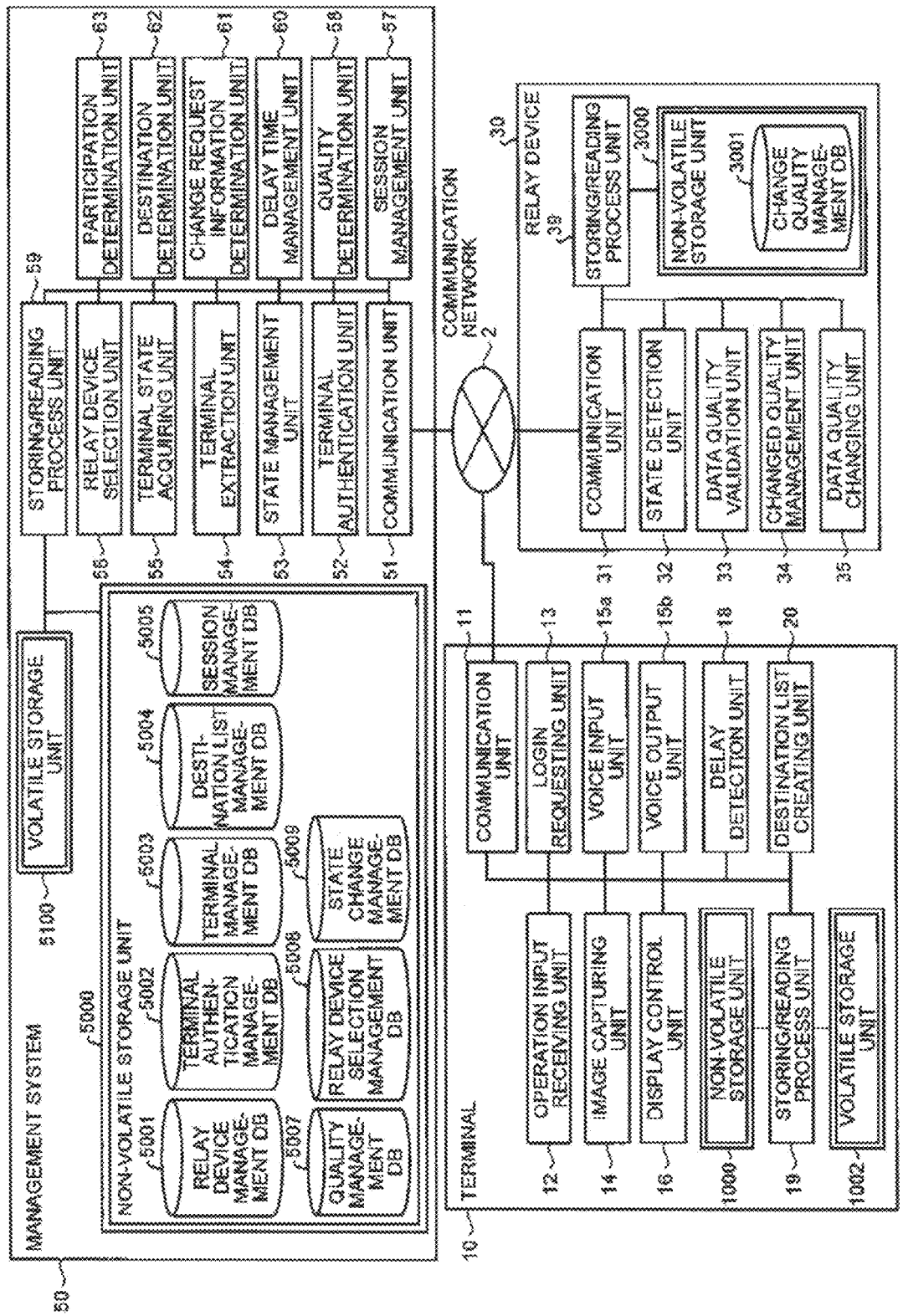
FIG. 5 is a functional block diagram of respective terminals, a device, and a system constituting the transmission system.

Next, a functional configuration of the embodiment will be described. FIG. 5 is a functional block diagram of each terminal, a device, and a system that constitute the transmission system 1 according to the embodiment. In FIG. 5, the terminal 10, the relay device 30, and the management system 50 are connected so as to communicate data to each other via the communication network 2. The program providing system 90 and the maintenance system 100 illustrated in FIG. 1 are not illustrated in FIG. 5 because they are not directly involved in a communication of a television conference.

Functional Configuration of Terminal

The terminal 10 includes a communication unit 11, an operation input receiving unit 12, a login requesting unit 13, an image capturing unit 14, an audio input unit 15a, an audio output unit 15b, a display control unit 16, a delay detection unit 18, a storing/reading process unit 19, and a destination list creating unit 20. These components are a function or a unit implemented by any of the components illustrated in FIG. 2 is operated by an instruction from the CPU 101 according to the program stored in the ROM 102. The terminal 10 includes a volatile storage unit 1002 constructed by the RAM 103 illustrated in FIG. 2 and a non-volatile storage unit 1000 constructed by the flash memory 104 illustrated in FIG. 2.

Each Functional Part of Terminal

Next, each part of the terminal will be described in detail. The communication unit 11 of the terminal 10 is implemented by the network I/F 111 illustrated in FIG. 2 and transmits/receives various pieces of data (or information) to/from the other terminal, device, or system via the communication network 2.

The communication unit 11 starts to receive each piece of state information indicating a state of each terminal 10 as a destination terminal candidate from the management system 50 before the terminal 10 establishes a session with the other terminal 10 and starts a television conference with a telephone call.

Herein, the destination terminal candidate is a partner with which the terminal 10 carries out a television conference, that is, the terminal 10 that may be designated as a session partner. That is, the terminal 10 cannot establish a session with a terminal that is not set as the destination terminal candidate in advance, so that the television conference cannot be carried out. The destination terminal candidate is a candidate for a partner terminal that carries out the television conference, that is, a partner terminal candidate.

The state information represents an operating state of each terminal 10 (whether it is in an ON-line state or OFF-line state) and a specific state of ON line whether it is in a call or in a waiting period (hereinafter, referred to as a communication state). The state information represents various states such that the cable is removed from the terminal 10, a voice can be output but an image cannot be output, and it is set not to output a voice (MUTE), as well as the operating state and the communication state of each terminal 10. Hereinafter, a case where the state information represents the operating state and the communication state will be described as an example.

The communication unit 11 transmits the start request information to the management system 50 when the terminal 10 operates as the start request terminal. The start request information is information that requests to start a session used for a television conference. Specifically, the start request information includes information indicating a start request, a terminal ID of the start request terminal that is a transmission source of the start request information, a terminal ID that identifies a destination terminal that becomes a session partner, and restriction information indicating whether a terminal other than the destination terminal is restricted in participation in the session. The terminal ID is information for identifying the terminal 10.

Specifically, the start request information includes "Invite" or "Private Invite". Herein, the "Invite" is information indicating start request, and is restriction information indicating that there is no participation restriction. By contrast, the "Private Invite" is information indicating start request, and is restriction information indicating that there is participation restriction.

Herein, the restriction information will be described in detail. In the transmission system 1 according to the embodiment, another terminal 10 can participate in a session that has been already established. However, there are some conferences in which another terminal 10 is not allowed to participate, such as when a highly confidential conference is carried out. Therefore, in the transmission system 1, another terminal 10 is restricted in participation in the established session corresponding to whether there is a participation restriction in the restriction information.

In the embodiment, it is assumed that a session including restriction information indicating that there is participation restriction is established. Accordingly, only the restriction information of "Private Invite" is used for the start request information in the embodiment.

In addition, the communication unit 11 transmits the participation request information to the management system 50 when the terminal 10 operates as the participation request terminal. Herein, the participation request information is information that requests to participate in the established session used for a television conference that has been already started. Specifically, the participation request information is information including information "Call" indicating that it is the participation request information, a terminal ID of the participation request terminal that is a transmission source of the participation request information, and a terminal ID of a participating terminal that is a terminal participating in the established session that the terminal desires to participate in. Specifically, the participating terminal is the start request terminal or the destination terminal that is indicated in the start request information transmitted when the established session is started. Herein, the communication unit 11 functions as a start request information acquiring unit that acquires the start request information and a participation request information acquiring unit that acquires the participation request information.

The operation input receiving unit 12 is implemented by the operation button 108 and the power switch 109 illustrated in FIG. 2 and receives various inputs from a user. For example, when the user turns on the power switch 109 illustrated in FIG. 2, the operation input receiving unit 12 illustrated in FIG. 5 receives "power ON" and turns on the power supply.

The login requesting unit 13 is implemented by an instruction from the CPU 101 illustrated in FIG. 2 and automatically transmits login request information indicating the login request and an IP address of the terminal 10 at this point to the management system 50 from the communication unit 11 via the communication network 2, triggered by receiving the "power ON". When the user turns off the power switch 109 in the ON state, the communication unit 11 transmits state information about turning off the power supply to the management system 50, and the operation input receiving unit 12 completely turns off the power supply. Accordingly, the management system 50 can recognize that the state of the terminal 10 is changed from the "power ON" state to the "power OFF" state.

The image capturing unit 14 is implemented by an instruction from the CPU 101 illustrated in FIG. 2, the camera 112 illustrated in FIG. 2, and the image capturing device I/F 113. The image capturing unit 14 images a subject and outputs image data obtained by the imaging. The audio input unit 15$a$ is implemented by the audio input/output I/F 116 illustrated in FIG. 2. When a voice of a user is converted into an audio signal by the microphone 114, the audio input unit 15$a$ inputs audio data according to the audio signal. The audio output unit 15$b$ is implemented by an instruction from the CPU 101 illustrated in FIG. 2 and the audio input/output I/F 116 illustrated in FIG. 2. The audio output unit 15$b$ outputs the audio signal according to the audio data to the speaker 115 and causes the speaker 115 to output a voice.

The display control unit 16 is implemented by the display I/F 117 illustrated in FIG. 2 and controls the external display 120 to transmit the image data. The display control unit 16 reflects the state information received after starting reception by the communication unit 11 and causes the display 120 to display a destination list including each destination name before the terminal 10 as a requesting source starts to make a call to have a television conference with the terminal 10 as a desired destination.

The delay detection unit 18 is implemented by an instruction from the CPU 101 illustrated in FIG. 2 and detects delay time (ms) of image data or audio data transmitted from another terminal 10 via the relay device 30.

The storing/reading process unit 19 is executed by an instruction from the CPU 101 illustrated in FIG. 2 and the SSD 105 illustrated as an example in FIG. 2, and performs processing so as to store various pieces of data in the non-volatile storage unit 1000 or read various pieces of data stored in the non-volatile storage unit 1000. The non-volatile storage unit 1000 stores a terminal identification (ID) for identifying the terminal 10, a password, and the like. The storing/reading process unit 19 also performs processing so as to store various pieces of data in the volatile storage unit 1002 or read the various pieces of data stored in the volatile storage unit 1002. The contents data received when making a call to the destination terminal is overwritten on the volatile storage unit 1002 each time it is received. Among these, an image is displayed on the display 120 by image data before overwritten, and a voice is output from the speaker 115 by audio data before overwritten.

Figure 23:
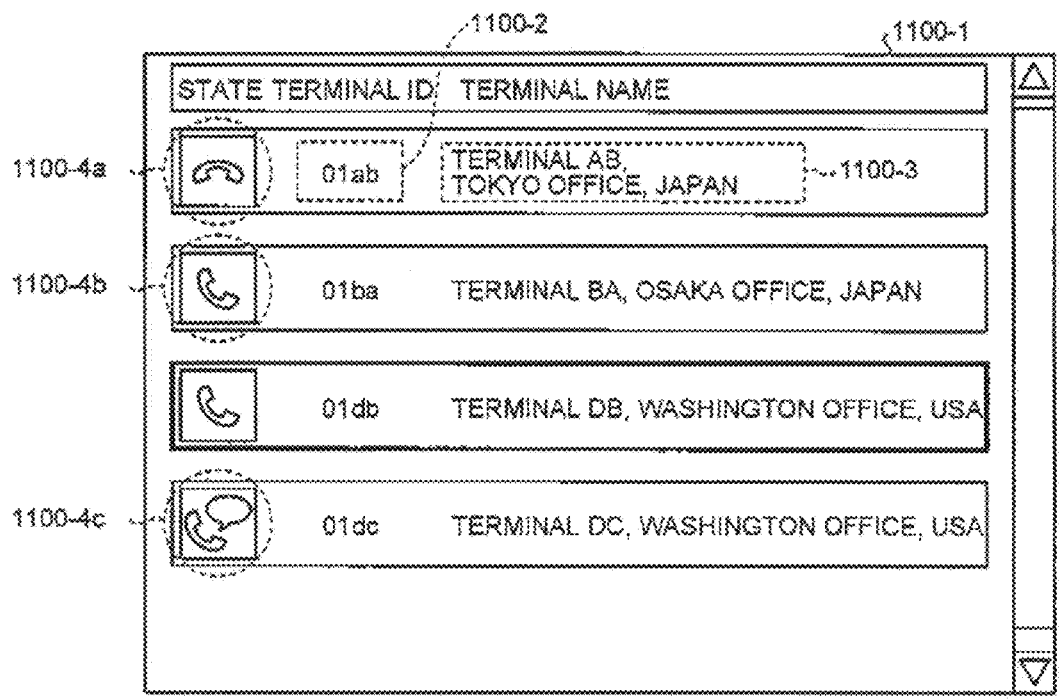
FIG. 23 is a diagram illustrating an example of displaying a destination list.

The destination list creating unit 20 creates and updates a destination list in which a state of a destination candidate is represented by an icon as illustrated in FIG. 23 based on destination list information to be described later and state information of the terminal 10 as each destination candidate to be described later that are received from the management system 50.

Functional Configuration of Relay Device

Next, a function or a unit of the relay device 30 will be described. The relay device 30 includes the communication unit 31, a state detection unit 32, a data quality validation unit 33, a changed quality management unit 34, a data quality changing unit 35, and a storing/reading process unit 39. Each of the components is a function or a unit implemented by any of the components illustrated in FIG. 3 being operated by an instruction from the CPU 201 according to a computer program stored in the ROM 202. In addition, the relay device 30 is constructed by the HD 204 illustrated in FIG. 3 and has a non-volatile storage unit 3000 in which stored various pieces of data or information is maintained even if the power supply of the relay device 30 is turned off.

Changed Quality Management Table

Figures 6, 7:
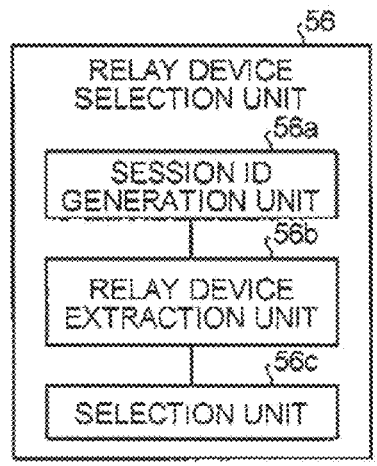
FIG. 6 is a functional block diagram specifically illustrating a relay device selection unit of FIG. 5.
FIG. 7 is a conceptual diagram illustrating a changed quality management table.

In the non-volatile storage unit 3000, a changed quality management database (DB) 3001 configured by the changed quality management table as illustrated in FIG. 7 is constructed. FIG. 7 is a conceptual diagram illustrating the changed quality management table. In the changed quality management table, an IP address of the terminal 10 as a relay destination of image data and image quality of the image data relayed by the relay device 30 to the relay destination are associated with each other and managed.

Figures 8, 9:
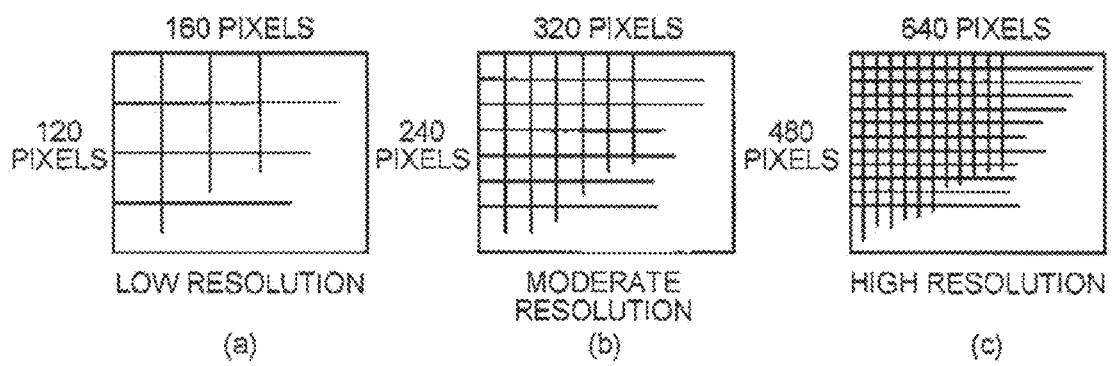
FIG. 8 illustrates the image quality of image data.
FIG. 9 is a conceptual diagram illustrating a relay device management table.

Resolution of an image of image data used in the embodiment will be described with reference to FIG. 8. FIG. 8 illustrates image quality of the image data. Illustrated in (a) of FIG. 8 is a low-resolution image as a base image including 160 pixels in the horizontal direction and 120 pixels in the vertical direction. Illustrated in (b) of FIG. 8 is a moderate-resolution image including 320 pixels in the horizontal direction and 240 pixels in the vertical direction. Illustrated in (c) of FIG. 8 is a high-resolution image including 640 pixels in the horizontal direction and 480 pixels in the vertical direction. Among these, when passing through a narrow-band path, image data of low image quality including only low-resolution image data as a base image is relayed. When the band is relatively wide, the low-resolution image data as the base image and image data of moderate image quality including moderate-resolution image data are relayed. When the band is very wide, low-resolution image data as a base image quality, moderate-resolution image data, and image data of high image quality including high-resolution image data are relayed. For example, when the relay device 30 relays image data to a destination terminal of which IP address is "1.3.2.4" in the changed quality management table illustrated in FIG. 7, the image quality (quality of the image) of the relayed image data is "high image quality".

Each Functional Part of Relay Device

Next, each functional configuration of the relay device 30 will be described in detail. Hereinafter, each part of the relay device 30 will be described in relation to the main components among the components illustrated in FIG. 3 for implementing each part of the relay device 30.

The communication unit 31 of the relay device 30 illustrated in FIG. 5 is implemented by the network I/F 209 illustrated in FIG. 3, and transmits/receives various pieces of data (or information) to/from another terminal, device, or system via the communication network 2. The state detection unit 32 is implemented by an instruction from the CPU 201 illustrated in FIG. 3, and detects an operating state of the relay device 30 including the state detection unit 32. The operating state includes "ON-line", "OFF-line", or "out of order".

The data quality validation unit 33 is implemented by an instruction from the CPU 201 illustrated in FIG. 3, and validates the image quality of image data to be relayed by searching the changed quality management table (refer to FIG. 7) using the IP address of the destination terminal as a search key and extracting the image quality of the corresponding image data to be relayed. The changed quality management unit 34 is implemented by an instruction from the CPU 201 illustrated in FIG. 3, and changes content of the changed quality management table of the changed quality management DB 3001 based on quality information to be described later transmitted from the management system 50. For example, assuming that during when a television conference is carried out between a start request terminal (terminal 10aa) of which terminal ID is "01aa" and a destination terminal (terminal 10db) of which terminal ID is "01db" by transmitting and receiving image data of high image quality, reception of the image data is delayed at the destination terminal (terminal 10db) because a television conference is started between a start request terminal (terminal 10bb) and a destination terminal (terminal 10ca), those having another television conference, via the communication network 2. In such a case, the relay device 30 needs to lower image quality of the image data that has been relayed from high image quality to moderate image quality. In such a case, the contents of the changed quality management table of the changed quality management DB 3001 is changed to lower the image quality of the image data relayed by the relay device 30 from high image quality to moderate image quality based on the quality information indicating the moderate image quality.

The data quality changing unit 35 is implemented by an instruction from the CPU 201 illustrated in FIG. 3, and changes the image quality of the image data transmitted from the terminal 10 of the transmission source based on the contents of the changed quality management table of the changed quality management DB 3001 that has been changed. The storing/reading process unit 39 is implemented by the HDD 205 illustrated in FIG. 3, and stores various pieces of data in the non-volatile storage unit 3000 or reads out various pieces of data stored in the non-volatile storage unit 3000.

Functional Configuration of Management System

Next, a function or a unit of the management system 50 will be described. The management system 50 includes a communication unit 51, a terminal authentication unit 52, a state management unit 53, a terminal extraction unit 54, a terminal state acquiring unit 55, a relay device selection unit 56, a session management unit 57, a quality determination unit 58, a storing/reading process unit 59, a delay time management unit 60, a change request information determination unit 61, a destination determination unit 62, and a participation determination unit 63. Each of these units is a function or a unit implemented by any of the components illustrated in FIG. 3 being operated by an instruction from the CPU 201 according to a computer program stored in the ROM 202. The management system 50 is constructed by the HD 204 illustrated in FIG. 3, and includes a non-volatile storage unit 5000 in which various pieces of data or information are kept being stored even if the power supply of the management system 50 is turned off. The non-volatile storage unit 5000 stores therein various pieces of information. In addition, the management system 50 includes a volatile storage unit 5100 constructed by the RAM 203 illustrated in FIG. 3.

Relay Device Management Table

In the non-volatile storage unit 5000, a relay device management DB 5001 configured by the relay device management table illustrated in FIG. 9 is constructed. FIG. 9 is a conceptual diagram illustrating the relay device management table. In the relay device management table, an operating state of each relay device 30, a date of reception when the state information indicating the operating state is received by the management system 50, an IP address of the relay device 30, and maximum data transmission rate (Mbps) at the relay device 30 are associated with each other and managed per each relay device ID that identifies each relay device 30. For example, the relay device management table illustrated in FIG. 9 represents that, with regard to the relay device 30a of which relay device ID is "111a", the operating state thereof is "ON-line", a date of reception when the state information is received by the management system 50 is "November 10th, 2009, 13:00", the IP address of the relay device 30a is "1.2.1.2", and the maximum data transmission rate at the relay device 30a is 100 Mbps.

Terminal Authentication Management Table

In addition, in the non-volatile storage unit 5000, a terminal authentication management DB 5002 configured by the terminal authentication management table as illustrated in FIG. 10 is constructed. FIG. 10 is a conceptual diagram illustrating the terminal authentication management table. The terminal authentication management table associates each of the terminal IDs of all of the terminals 10 managed by the management system 50 with each password to be managed. Herein, the terminal ID is information that identifies the terminal 10 and the password is information used for authenticating the terminal 10. For example, the terminal authentication management table illustrated in FIG. 10 indicates that the terminal ID of the terminal 10aa is "01aa" and the password thereof is "aaaa".

The terminal ID and the relay device ID of the embodiment represent identification information such as language, a character, a symbol, or various marks that are used for uniquely identifying the terminal 10 and the relay device 30, respectively. The terminal ID and the relay device ID may be identification information generated by combining at least two of the language, the character, the symbol, and the various marks.

Terminal Management Table

In the non-volatile storage unit 5000, a terminal management DB 5003 configured by the terminal management table as illustrated in FIG. 11 is constructed. FIG. 11 is a Conceptual diagram illustrating the terminal management table. In the terminal management table, a terminal name, an operating state of each terminal 10, a communication state with the other terminal, a date of reception when the management system 50 receives login request information to be described later, and the IP address of the terminal 10 are associated and managed per each terminal ID of each terminal 10.

The operating state includes an "ON-line" state where the power supply is turned on and communication may be performed or is being performed, and an "OFF-line" state where the communication cannot be performed because the power supply is not turned on.

The communication state includes the followings: "Calling" that represents a state of calling the other terminal 10, that is, a state where start request information of a session used for the television conference is transmitted to the other terminal 10 and waiting for the response; "Ringing" that represents a state of being called from the other terminal 10, that is, a state where the start request information is received from the other terminal 10 and the response to the received start request information is not completed; "Accepted" that represents a state where the response for permission is completed with respect to the start request information from the other terminal 10 but the session is not completely established, and a state where reception of the response for permission is completed with respect to the start request information transmitted by the terminal itself but the session is not completely established; "Busy" that represents a state where the session with the other terminal 10 is established and the contents data of the TV conference is being transmitted; and "None" that represents a state where communication with the other terminal is not performed and being in a waiting period.

The above-described communication state is a communication state corresponding to a session having no participation restriction established according to the start request information including the restriction information indicating that there is no participation restriction. In addition, the management system 50 according to the embodiment manages the communication state corresponding to a session having participation restriction established according to the start request information including the restriction information indicating that there is participation restriction as a communication state different from the communication state corresponding to the session having no participation restriction. That is, there are states such as "Private Calling", "Private Ringing", "Private Accepted", and "Private Busy" as communication states with respect to the session having participation restriction, respectively corresponding to the states such as "Calling", "Ringing", "Accepted", and "Busy" with respect to the session having no participation restriction. As described above, the communication states are separately managed corresponding to whether there is the participation restriction, so that the management system 50 according to the embodiment can specify whether there is the participation restriction according to the communication state.

It is assumed that the session including restriction information that there is participation restriction is established in the embodiment. Therefore, only "Private Calling", "Private Ringing", "Private Accepted", and "Private Busy" are used as a communication state other than "None" in the embodiment.

For example, the terminal management table illustrated in FIG. 11 represents that, with regard to the terminal 10aa of which terminal ID is "01aa", the terminal name thereof is "Terminal AA, Tokyo office, Japan", the operating state thereof is "ON-line", the communication state thereof is "None" indicating not communicating with the other terminal and in a waiting period, a date of reception of the login request information by the management system 50 is "November 10th, 2009, 13:40", and the IP address of the terminal 10aa is "1.2.1.3".

According to the terminal management table illustrated in FIG. 11, in terms of the communication state, the communication state of a terminal of which terminal ID is "01ba" is "Private Calling", the communication state of a terminal of which terminal ID is "01bb" is "Private Busy", and the communication state of a terminal of which terminal ID is "01da" is "Private Busy".

Destination List Management Table

In addition, in the non-volatile storage unit 5000, a destination list management DB 5004 configured by the destination list management table as illustrated in FIG. 12 is constructed. FIG. 12 is a conceptual diagram illustrating the destination list management table. In the destination list management table, the terminal ID of the start request terminal that is the terminal 10 as a requesting source of the start request information of a session used for a television conference including a call managed by the management system 50 is associated with a terminal ID that identifies the destination terminal candidate that is the terminal 10 being a destination candidate of the contents data transmitted from the terminal 10, and managed. For example, the destination list management table illustrated in FIG. 12 represents that a destination terminal candidate that can request to start the television conference from a terminal of which terminal ID is "01aa" (terminal 10aa) is a terminal 10ab of which terminal ID is "01ab", a terminal 10ba of which terminal ID is "01ba", a terminal 10db of which terminal ID is "01db", and a terminal 10dc of which terminal ID is "01de". These destination terminal candidates are updated by addition or deletion by requesting addition or deletion with respect to the management system 50 by the start request terminal.

Session Management Table

In the non-volatile storage unit 5000, a session management DB 5005 configured by the session management table as illustrated in FIG. 13 is constructed. FIG. 13 is a conceptual diagram illustrating the session management table. In the session management table, a relay device ID of the relay device 30 used for relaying the contents data in the session, a terminal ID of the start request terminal that is a transmission source of the start request information of the session, a terminal ID of the destination terminal designated as a destination in the start request information of the session, delay time (ms) of the reception when the image data is received by the destination terminal, and a date of reception when delay information indicating the delay time is transmitted from the destination terminal and received by the management system 50 are associated with each other and managed per each session ID for identifying a session in which the contents data is transmitted between the terminals. For example, in the session management table illustrated in FIG. 13, the relay device 30e (relay device ID "111e") selected in a session executed by using a session ID "se1" relays contents data between the start request terminal (terminal 10aa) of which terminal ID is "01aa" and the destination terminal (terminal 10db) of which terminal ID is "01db", and it is represented that the delay time of the image data at the time point of "November 10th, 2009, 14:00" is 200 (ms) in the destination terminal (terminal 10db). In a case where a television conference is carried out between two terminals 10, a date of reception of the delay information may be managed based on the delay information transmitted from the start request terminal instead of the destination terminal. However, in a case where the television conference is carried out among three or more terminals 10, a date of reception of the delay information is managed based on the delay information transmitted from the terminal 10 on the reception side of the contents data.

Quality Management Table

In addition, in the non-volatile storage unit 5000, a quality management DB 5007 configured by the quality management table as illustrated in FIG. 14 is constructed. FIG. 14 is a conceptual diagram illustrating the quality management table. In the quality management table, the image quality (quality of the image) of the image data relayed by the relay device 30 is associated with the delay time (ms) of the image data in the start request terminal or the destination terminal, and is managed.

Relay Device Selection Management Table

In addition, in the non-volatile storage unit 5000, a relay device selection management DS 5008 configured by the relay device selection management table as illustrated in FIG. 15 is constructed. FIG. 15 is a conceptual diagram illustrating the relay device selection management table. In the relay device selection management table, the relay device ID of the relay device 30 used for relaying the contents data is associated with each terminal ID of all of the terminal 10 managed by the management system 50, and is managed.

State Change Management Table

In the non-volatile storage unit 5000, a state change management DB 5009 configured by the state change management table as illustrated in FIG. 16 and FIG. 17 is constructed. FIG. 16 and FIG. 17 are conceptual diagrams illustrating the state change management table. In the state change management table of FIG. 16, change request information indicating a request to change the communication state between the terminals, state-before-change information indicating a communication state before changed by the state management unit 53 to be described later, change information indicating a communication state changed by the state management unit 53 are associated with each other and managed. In the state change management table of FIG. 17, the change request information, terminal information for identifying the start request terminal and the destination terminal, the state-before-change information, and the change information are associated with each other and managed.

The state change management table of FIG. 17 indicates that the management system 50 changes a communication state "None" (before change) of the start request terminal to "Private Calling", and changes a communication state "None" (before change) of the destination terminal to "Private Ringing", when receiving the change request information "Private Invite". The change request information includes "Invite", "Private Invite", "Accept" illustrated in FIG. 17, and "Join", "Call", "Leave", and the like illustrated in FIG. 16.

In the embodiment, it is assumed that the session including restriction information that there is participation restriction is established. Therefore, only the state-before-change information and the change information of "Private Accepted", "Private Busy", "Private Calling", "Private Ringing", "Private Accepted", and "Private Busy" are used in FIG. 16 and FIG. 17. For a similar reason, the change request information of "Invite" in FIG. 17 is not used in the embodiment.

"Invite" is information included in the start request information and the change request information accompanying transmission of the start request information. "Accept" is the change request information accompanying reception of a response to the start request information, and indicates permission to start the communication, that is, to establish a session. "Join" is the change request information accompanying completion of session establishment corresponding to the start request information, and indicates that the start of relaying the contents data is requested. "Call" is information included in the participation request and is also the change request information accompanying the transmission of the participation request, and indicates to request participation in the established session. "Leave" is the change request information requesting the end of the session.

Each Functional Part of Management System

Next, each functional part of the management system 50 will be described in detail. Hereinafter, each part of the management system 50 will be described in relation to the main components for implementing each part of the management system 50 among the components illustrated in FIG. 3.

The communication unit 51 is executed by the network I/F 209 illustrated in FIG. 3, and transmits/receives various pieces of data (or information) to/from another terminal, device, or system via the communication network 2. The terminal authentication unit 52 performs terminal authentication by searching the terminal authentication management table (refer to FIG. 10) of the non-volatile storage unit 5000 using a terminal TD and a password included in the login request information received via the communication unit 51 as a search key, and determining whether the same terminal ID and the same password are managed by the terminal authentication management table.

The communication unit 51 has a function as a notification unit that transmits a notification of participation failure to a terminal that has performed a participation request when the participation determination unit 63 to be described later determines that the established session has participation restriction and participation is not allowed.

The state management unit 53 manages the operating state and the communication state of the terminal management table illustrated in FIG. 11. In order to manage the operating state of the terminal 10 that has requested login (login request terminal), the state management unit 53 associates the terminal management table (refer to FIG. 11) with the terminal ID of the login request terminal, the operating state of the login request terminal, the date of reception when the login request information is received by the management system 50, and the IP address of the login request terminal, to be managed. The state management unit 53 sets the operating state indicating OFF-line of the terminal management table (refer to FIG. 11) to ON-line based on information that the power supply from the terminal 10 is turned on by turning on the power switch 109 of the terminal 10 in an OFF-state by a user of the terminal 10. In addition, the state management unit 53 sets the operating state indicating ON-line of the terminal management table (refer to FIG. 11) to OFF-line based on information that the power supply from the terminal 10 is turned off by turning off the power switch 109 of the terminal 10 in an ON-state by the user.

When the change request information transmitted by the start request terminal or the destination terminal of the start request information of the television conference is received by the communication unit 51, the state management unit 53 appropriately changes at least one of the communication state and the operating state of at least one of the start request terminal and the destination terminal in the terminal management table (refer to FIG. 11) based on the change request information.

Figure 18:
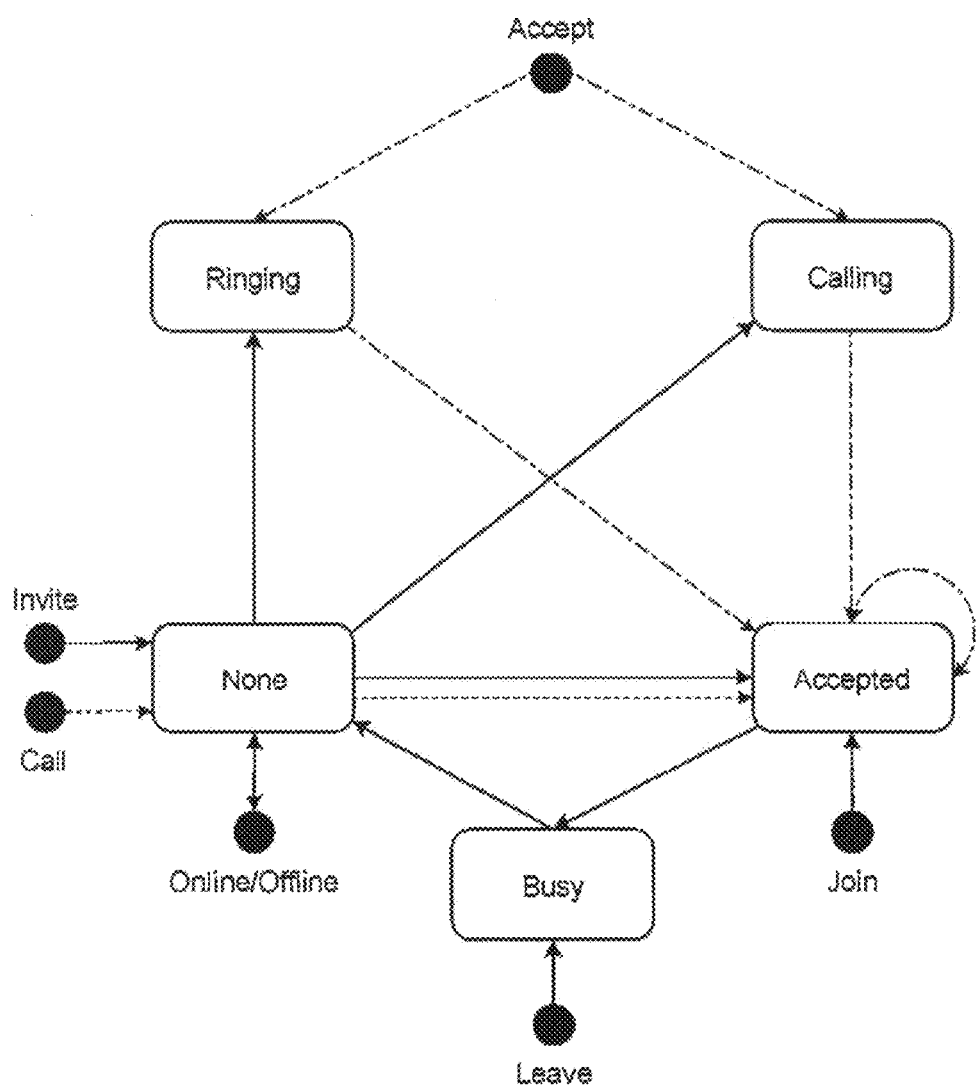
FIG. 18 is a state transition diagram of a communication state.
Figure 19:
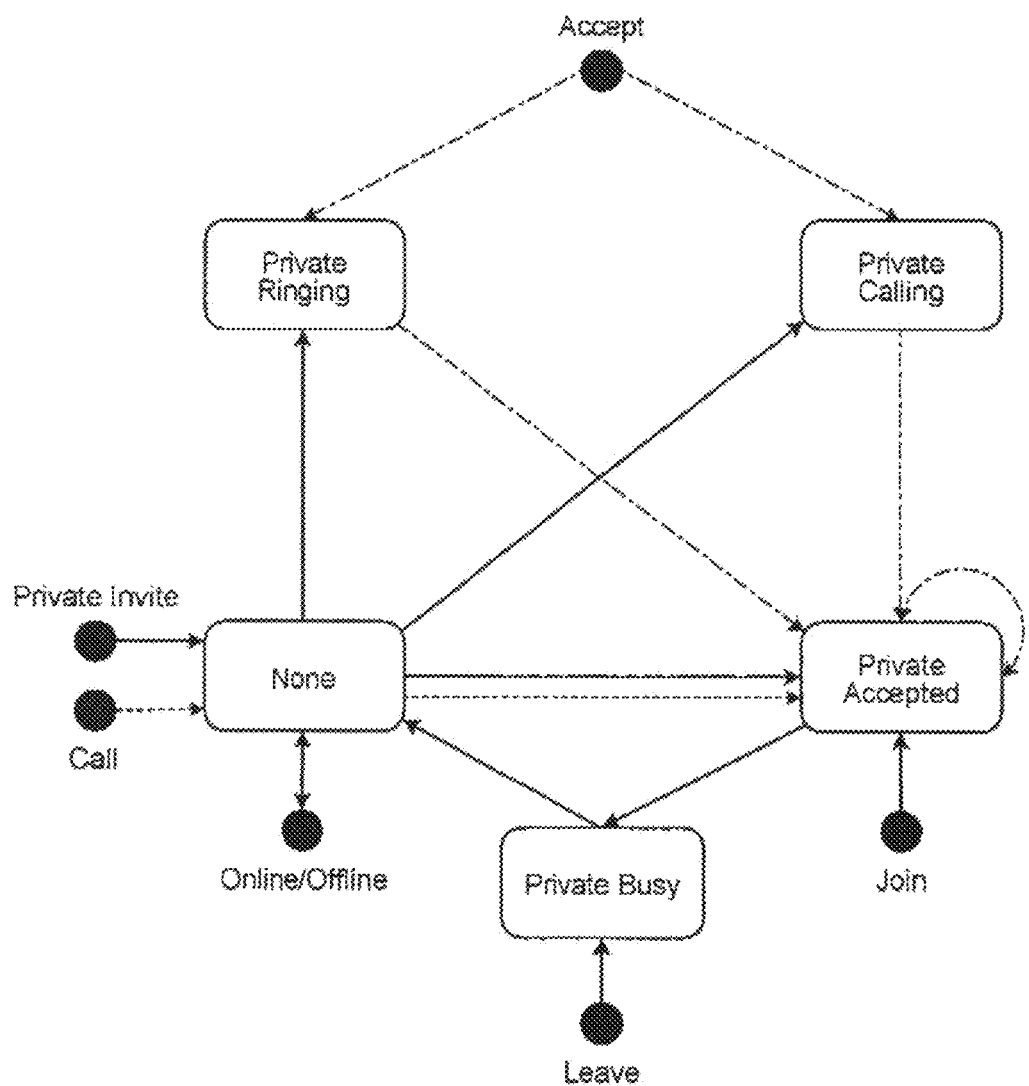
FIG. 19 is a state transition diagram of a communication state.

FIG. 18 and FIG. 19 are state transition diagrams of the communication state managed by the state management unit 53. The state management unit 53 changes the communication state of the terminal 10 according to a rule to change the communication state (refer to FIG. 18 and FIG. 19) effected by referring to the state change management table illustrated in FIG. 16 and FIG. 17. In the embodiment, it is assumed that the session including restriction information that there is participation restriction is established. Therefore, FIG. 18 is not used and FIG. 19 is used.

For example, when receiving the change request information "Accept", as illustrated in FIG. 19, the state management unit 53 changes the communication state to "Private Accepted" if the communication state of the terminal 10 is "Private Ringing" or "Private Calling", and keeps the communication state "Private Accepted" if the communication state of the terminal 10 is "Private Accepted".

In the embodiment, the state change management table (refer to FIG. 16 and FIG. 17) is used to change the state by the state management unit 53, but the present invention is not limited thereto. In this case, a computer program for management system may provide that the state management unit 53 may change the communication state according to a transition rule of the communication state illustrated in the state transition diagrams of FIG. 18 and FIG. 19.

The terminal extraction unit 54 searches the destination list management table (refer to FIG. 12) using the terminal ID of a target terminal that becomes a processing target such as the terminal 10 that has requested login as a search key, and extracts the terminal ID by reading out the terminal ID of the destination terminal candidate that can make a call to the target terminal, that is, establish a session. Specifically, the terminal extraction unit 54 reads out the terminal ID of the destination terminal candidate associated with the terminal ID of the start request terminal in agreement with the terminal ID of the target terminal in the destination list management table (refer to FIG. 12).

The terminal extraction unit 54 searches the destination list management table using the terminal ID of the target terminal as a key, and also extracts a terminal ID of another terminal 10 in which the terminal ID of the target terminal is registered as the destination terminal candidate. Specifically, the terminal extraction unit 54 reads out the terminal ID of the start request terminal associated with the terminal ID of the destination terminal candidate in agreement with the terminal ID of the target terminal in the destination list management table (refer to FIG. 12).

The terminal state acquiring unit 55 searches the terminal management table (refer to FIG. 11) using the terminal ID as a search key, and reads out the operating state and the communication state per each terminal ID. Accordingly, the terminal state acquiring unit 55 can acquire the operating state of the destination terminal candidate that can make a call to a terminal that has requested login. The terminal state acquiring unit SS also searches the terminal management table and acquires the operating state of the terminal that has requested login.

The relay device selection unit 56 performs processing of selecting one relay device 30 from a plurality of relay devices 30. Accordingly, the relay device selection unit 56 implements a session ID generation unit 56a, a relay device extraction unit 56b, and a selection unit 56c illustrated in FIG. 6, by an instruction from the CPU 201 illustrated in FIG. 3. FIG. 6 is a functional block diagram specifically illustrating the relay device selection unit 56 of FIG. 5.

Among these, the session ID generation unit 56a generates a session ID for identifying a session in which the contents data is transmitted between the terminals. The relay device extraction unit 56b searches the relay device selection management table (refer to FIG. 15) based on the terminal ID of the start request terminal and the terminal ID of the destination terminal included in the start request information transmitted from the start request terminal to extract each corresponding relay device ID. The selection unit 56c selects the relay device 30 by selecting a relay device ID of the relay device 30 of which operating state is "ON-line" from among the relay devices 30 managed by the relay device management table (refer to FIG. 9).

The session management unit 57 associates the session ID generated in the session ID generation unit 56a, a terminal ID of a requesting source terminal, and a terminal ID of the destination terminal with the session management table of the non-volatile storage unit 5000 (refer to FIG. 13) to be stored and managed. The session management unit 57 stores therein and manages the relay device ID of one relay device 30 that has been finally selected per each session ID with respect to the session management table.

In addition, the session management unit 57 searches the session management table (refer to FIG. 13) using, as a search key, a terminal ID of the participating terminal that has already participated in a target session of the participation request included in the participation request information, and extracts a session ID of the target session of the participation request. Specifically, the session management unit 57 searches for a terminal ID of the start request terminal or a terminal ID of the destination terminal in agreement with the terminal ID of the participating terminal in the session management table (FIG. 13). And the session management unit 57 extracts a session ID associated with the corresponding terminal ID.

The quality determination unit 58 searches the quality management table (refer to FIG. 14) using the delay time as a search key and extracts image quality of the corresponding image data to determine image quality of the image data relayed by the relay device 30. The storing/reading process unit 59 is executed by the HDD 205 illustrated in FIG. 3 and performs processing to store various pieces of data in the non-volatile storage unit 5000 or read out various pieces of data stored in the non-volatile storage unit 5000. In addition, the storing/reading process unit 59 also performs processing to store various pieces of data in the volatile storage unit 5100 or read out various pieces of data stored in the volatile storage unit 5100.

The delay time management unit 60 extracts the corresponding terminal ID by searching the terminal management table (refer to FIG. 11) using the IP address of the destination terminal as a search key, and stores and manages the delay time indicated by the delay information in a field of delay time in a record including the extracted terminal ID in the session management table (refer to FIG. 13).

The change request information determination unit 61 refers to the change request information and determines whether the change request information is a specific piece of change request information. Herein, the specific piece Of change request information is "Invite", "Private Invite", and "Accept". That is, the specific piece of change request information is the change request information stored in the state change management table illustrated in FIG. 17.

The destination determination unit 62 refers to the destination list management table (refer to FIG. 12) and determines whether the destination terminal ID of the terminal 10 that requests participation is included in the destination terminal ID of the terminal 10 participating in a contents data session sed extracted by the terminal extraction unit 54.

When the communication unit 51 receives a participation request to the established session from a predetermined terminal, the participation determination unit 63 refers to the restriction information corresponding to the established session and determines whether the participation request terminal that is a terminal of a transmission source of the participation request information is allowed to participate in the established session.

Specifically, according to the acquisition of the participation request information, the participation determination unit 63 prohibits the participation request terminal from participating in the established session when the restriction information designates the participation restriction.

Process and Operation of Embodiment

Figure 20:
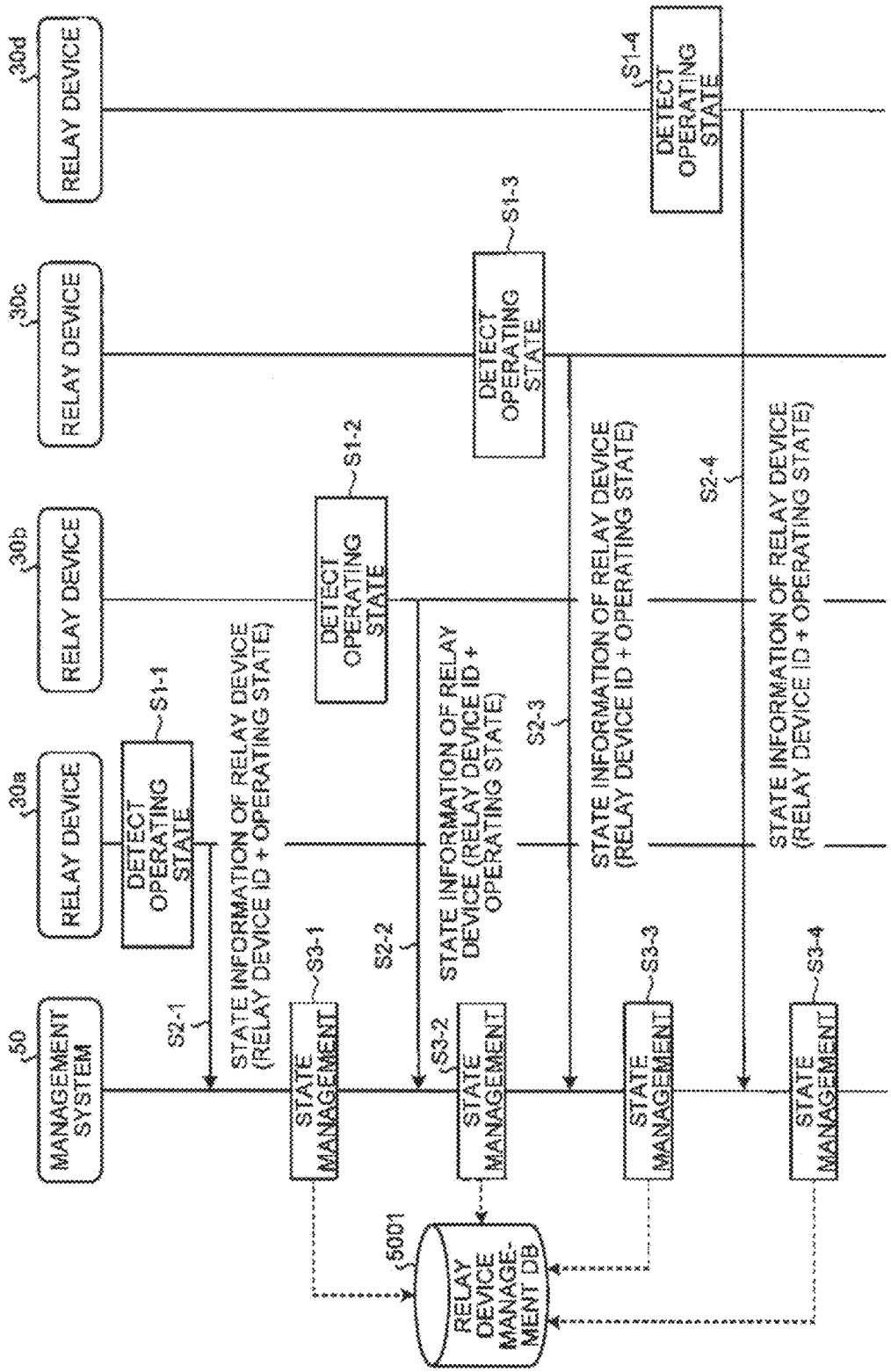
FIG. 20 is a sequence diagram illustrating a process of managing state information showing an operating state of each relay device.
Figure 21:
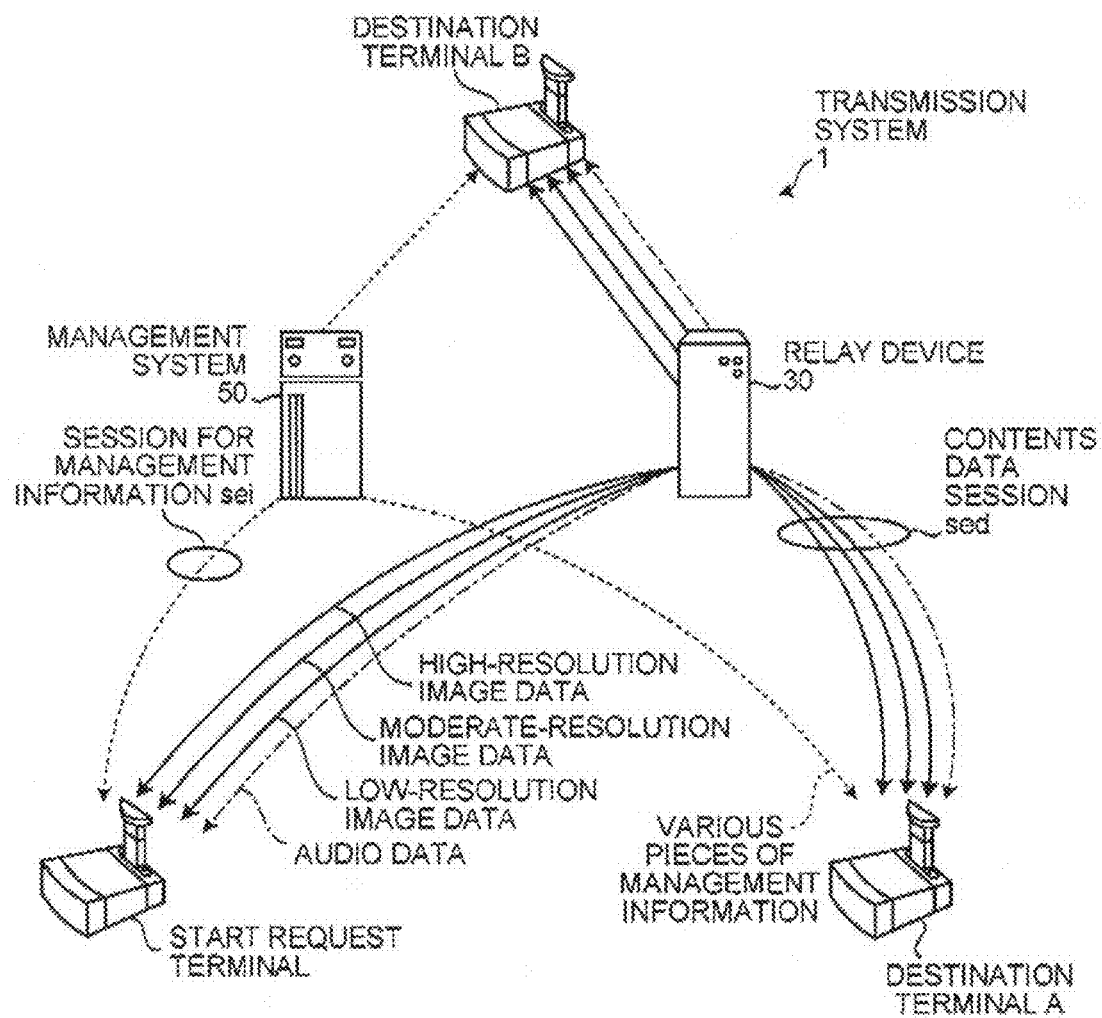
FIG. 21 is a conceptual diagram illustrating a state of transmission/reception of contents data and various pieces of management information in the transmission system.
Figure 22:
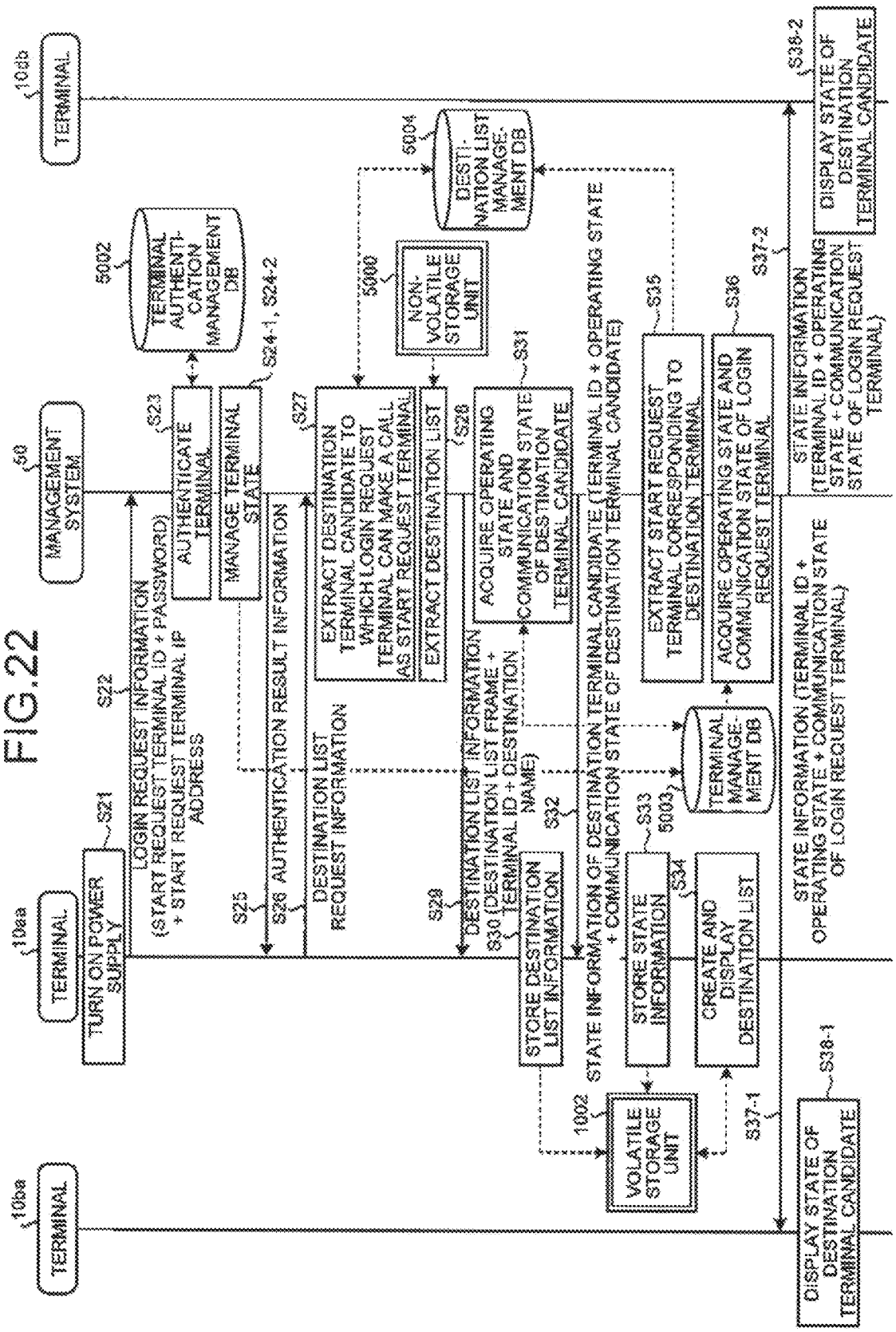
FIG. 22 is a sequence diagram illustrating a process of a preliminary stage for starting call between the transmission terminals.
Figure 24:
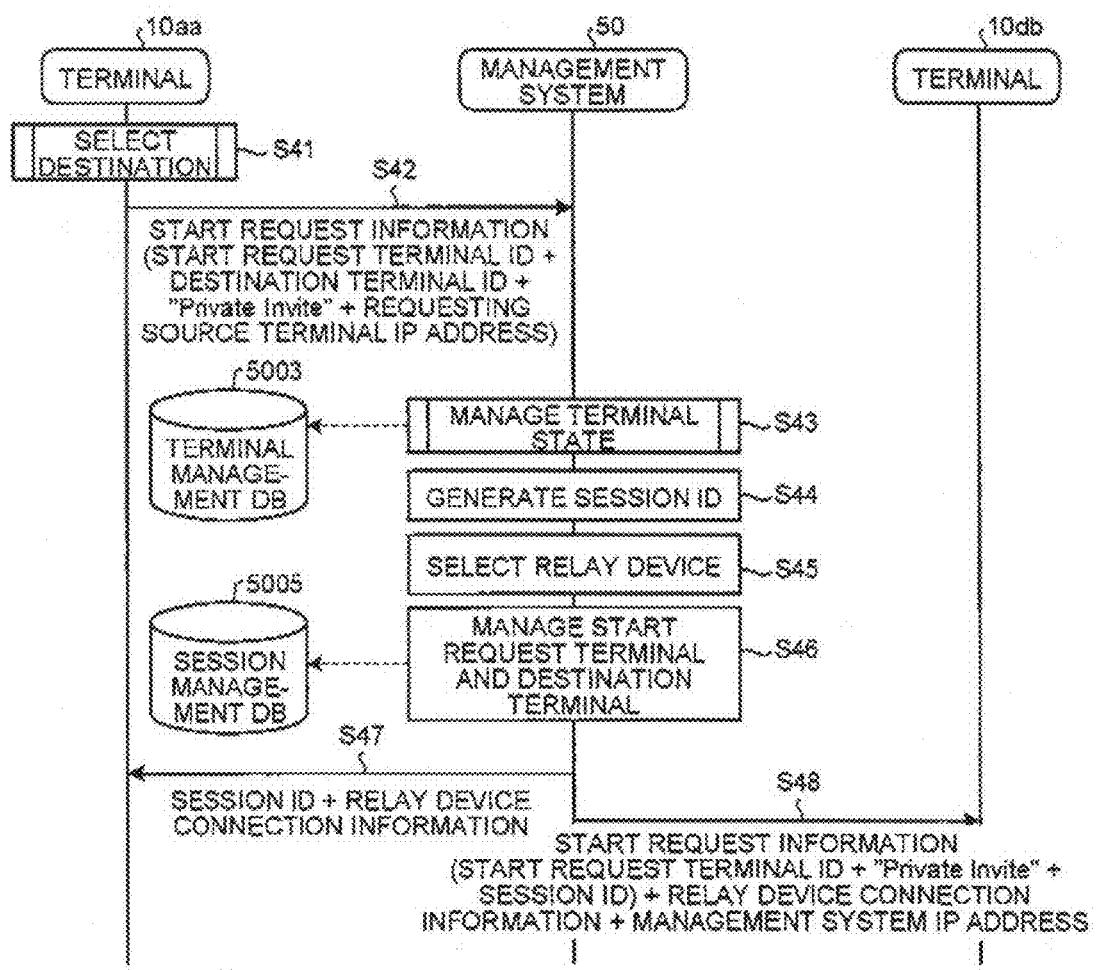
FIG. 24 is a sequence diagram illustrating a process of requesting to start communication.
Figure 25:
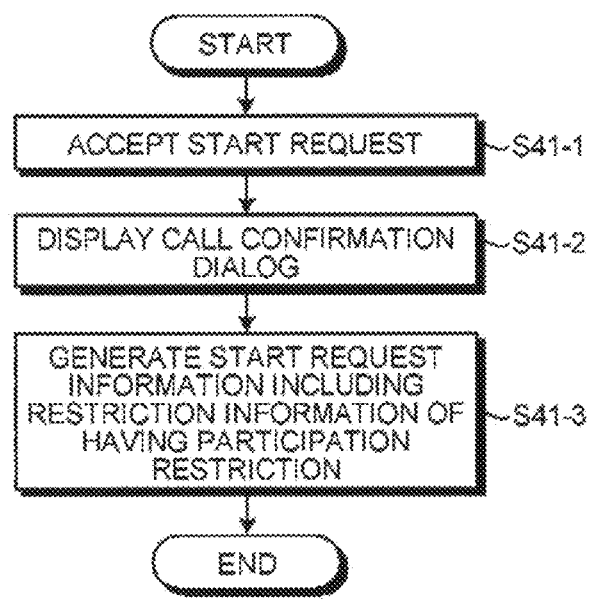
FIG. 25 is a flow chart illustrating a specific process of a start request terminal in a destination selecting process.
Figure 26:
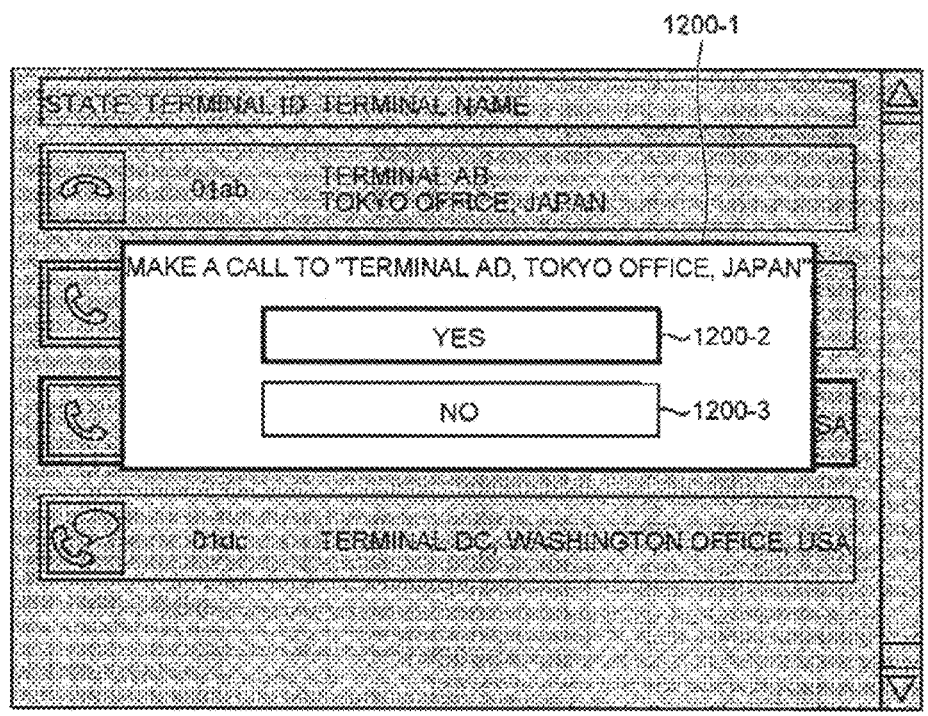
FIG. 26 is a diagram illustrating an example of displaying a call confirmation dialog.
Figure 27:
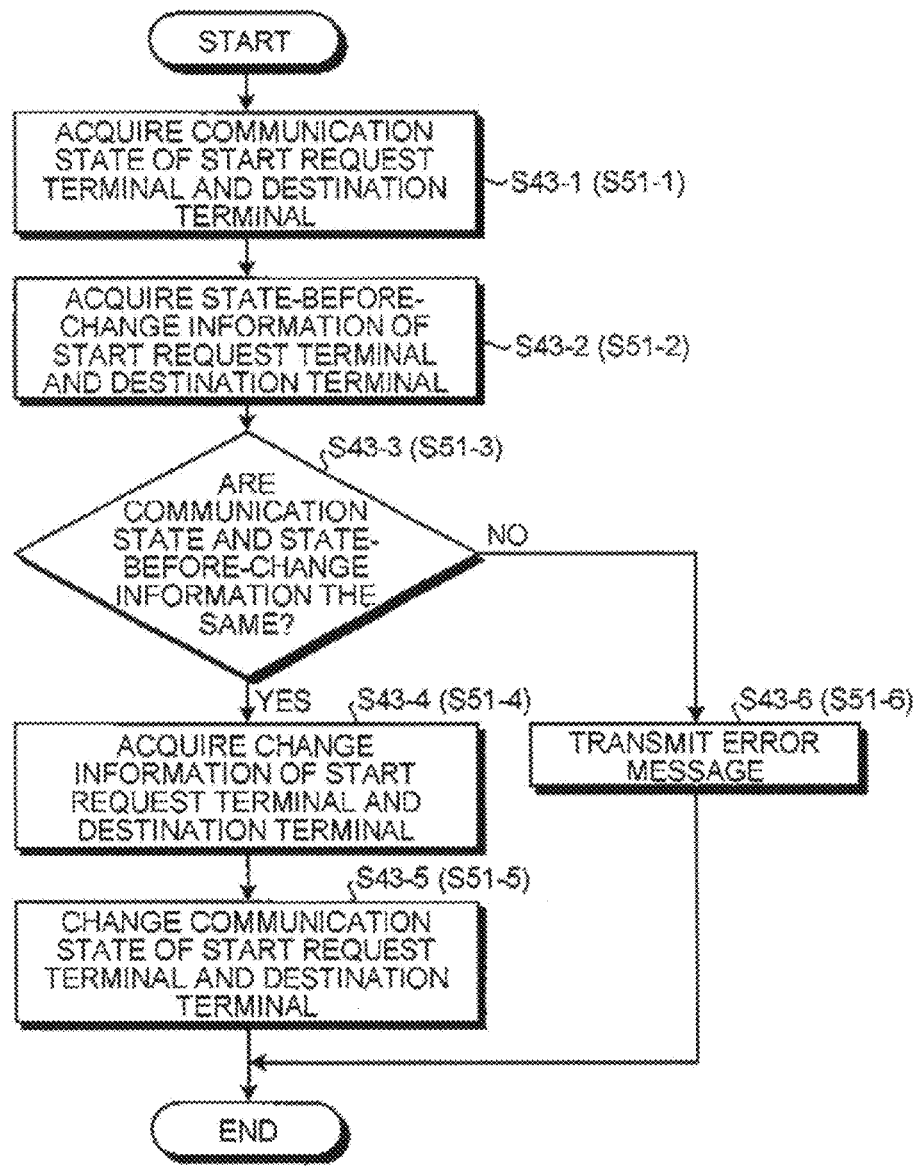
FIG. 27 is a processing flow chart illustrating a process of changing communication state.
Figure 28:
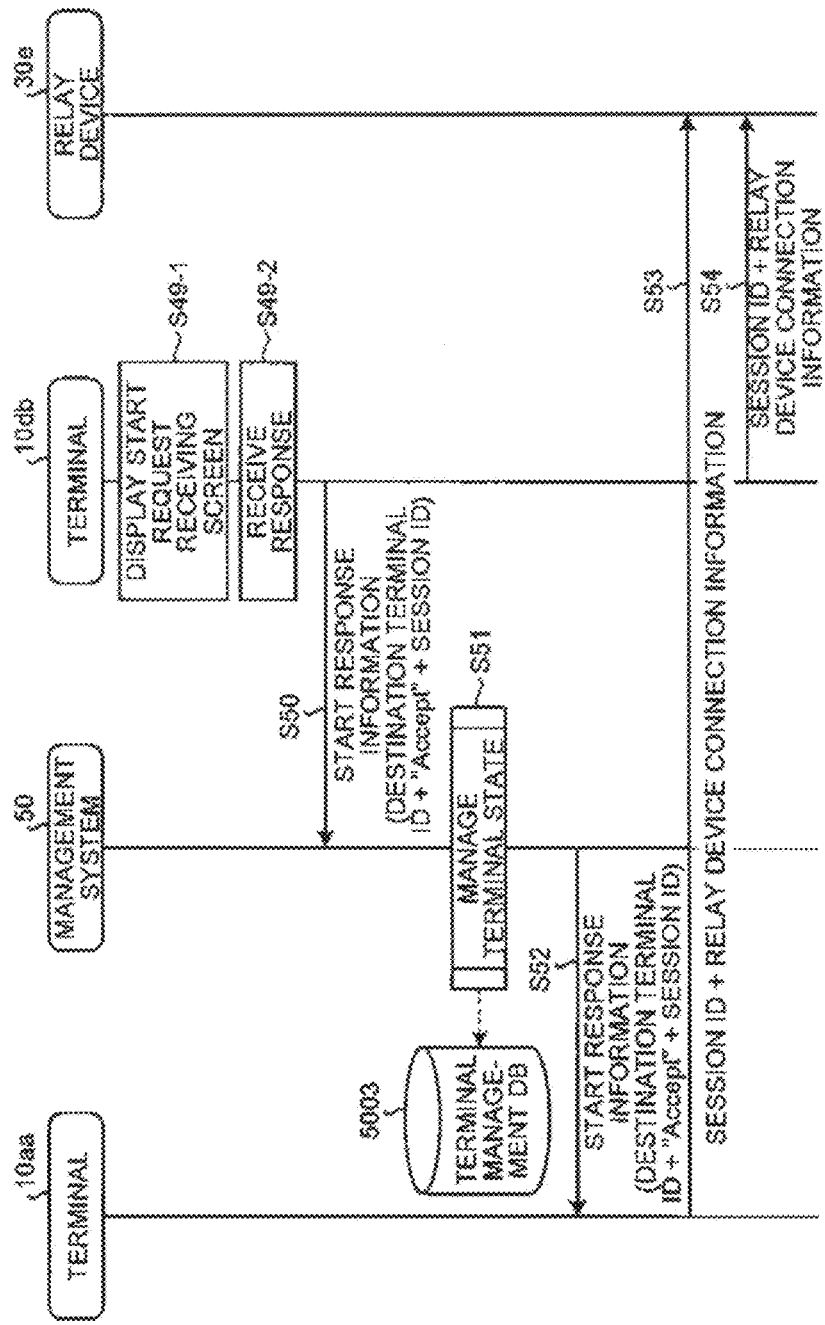
FIG. 28 is a sequence diagram illustrating a process of permitting the request to start communication.
Figure 29:
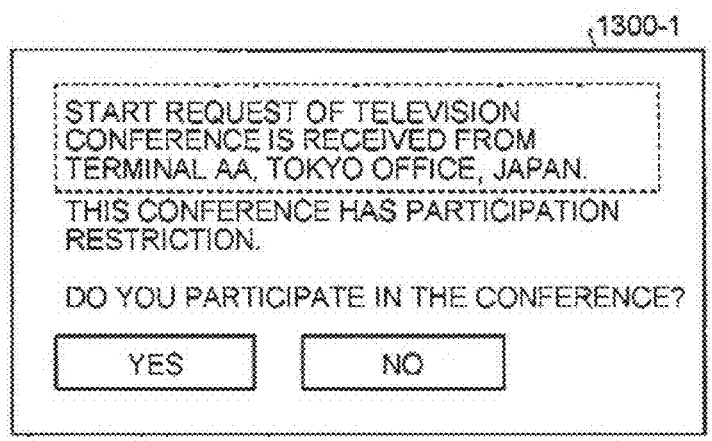
FIG. 29 is a diagram illustrating an example of displaying a start request receiving screen.
Figure 30:
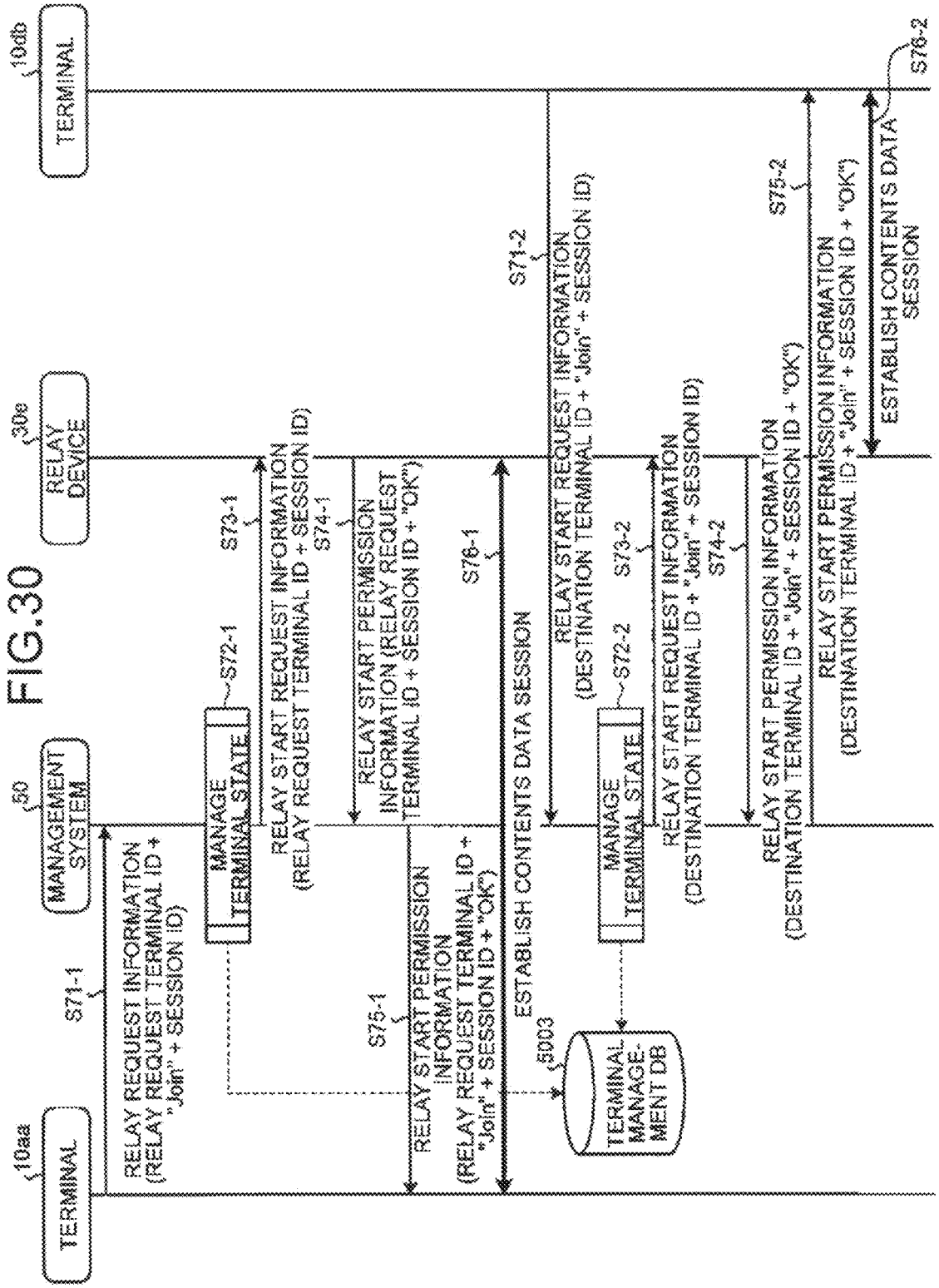
FIG. 30 is a sequence diagram illustrating a process of requesting to relay contents data.
Figure 31:
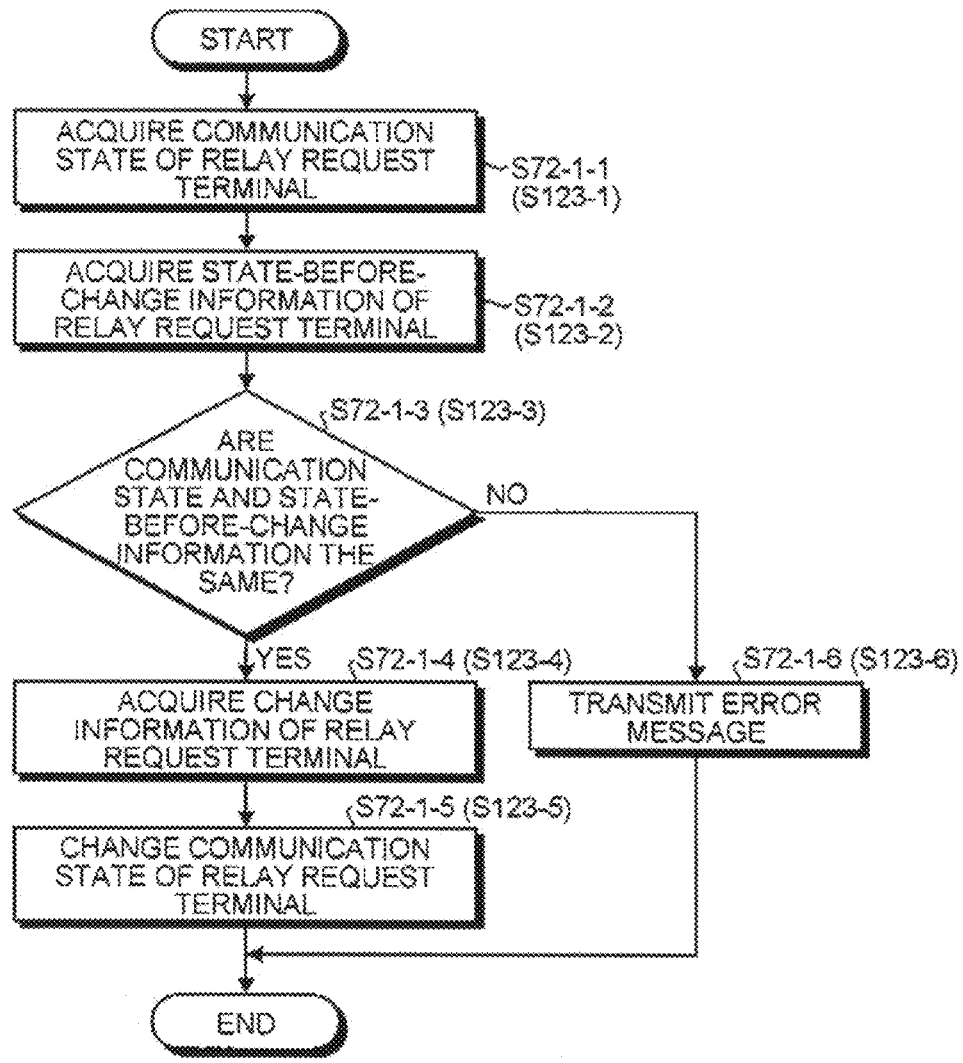
FIG. 31 is a processing flow chart illustrating a process of changing the communication state.
Figure 32:
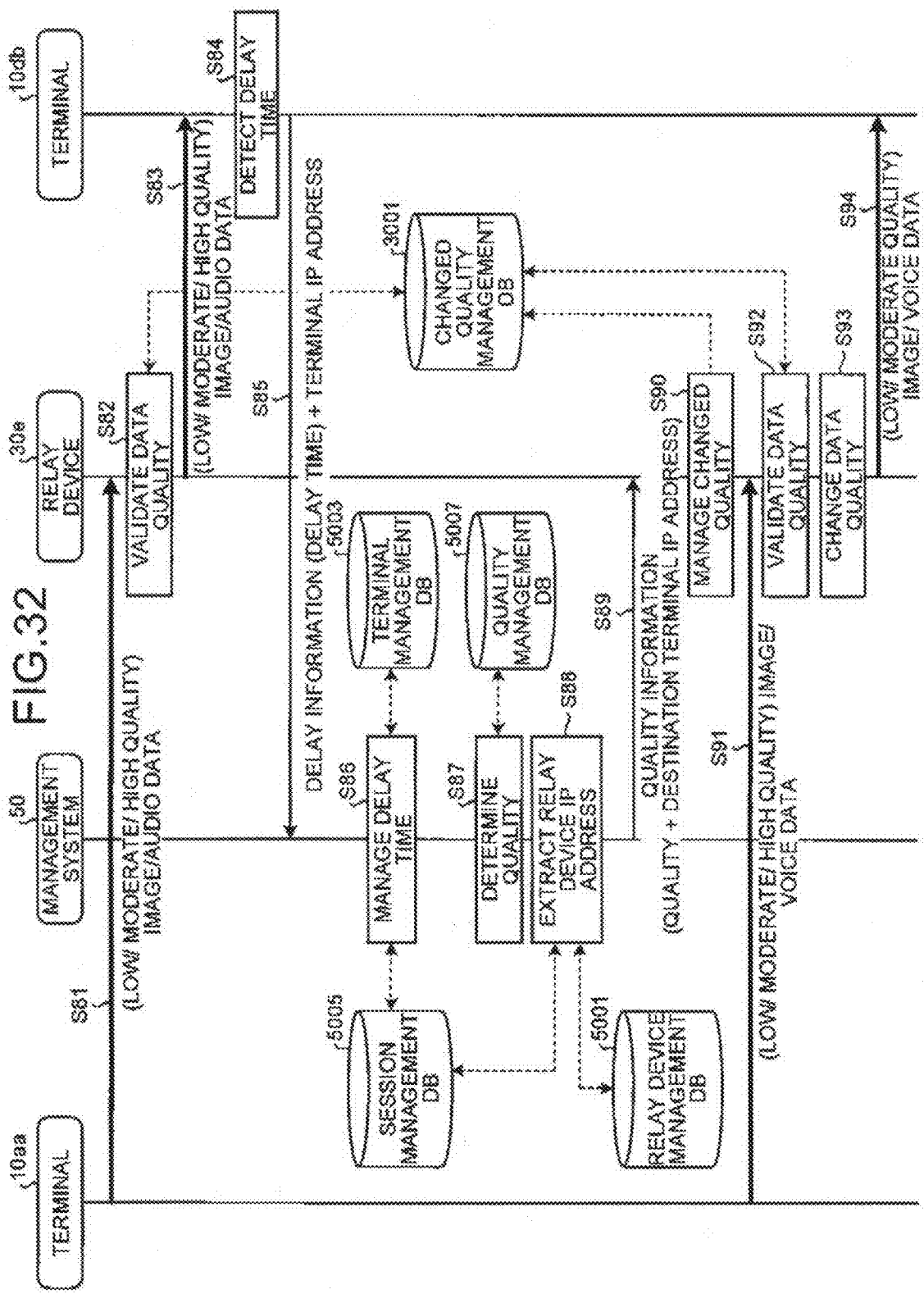
FIG. 32 is a sequence diagram illustrating a process of transmitting/receiving contents data between the transmission terminals.
Figure 33:
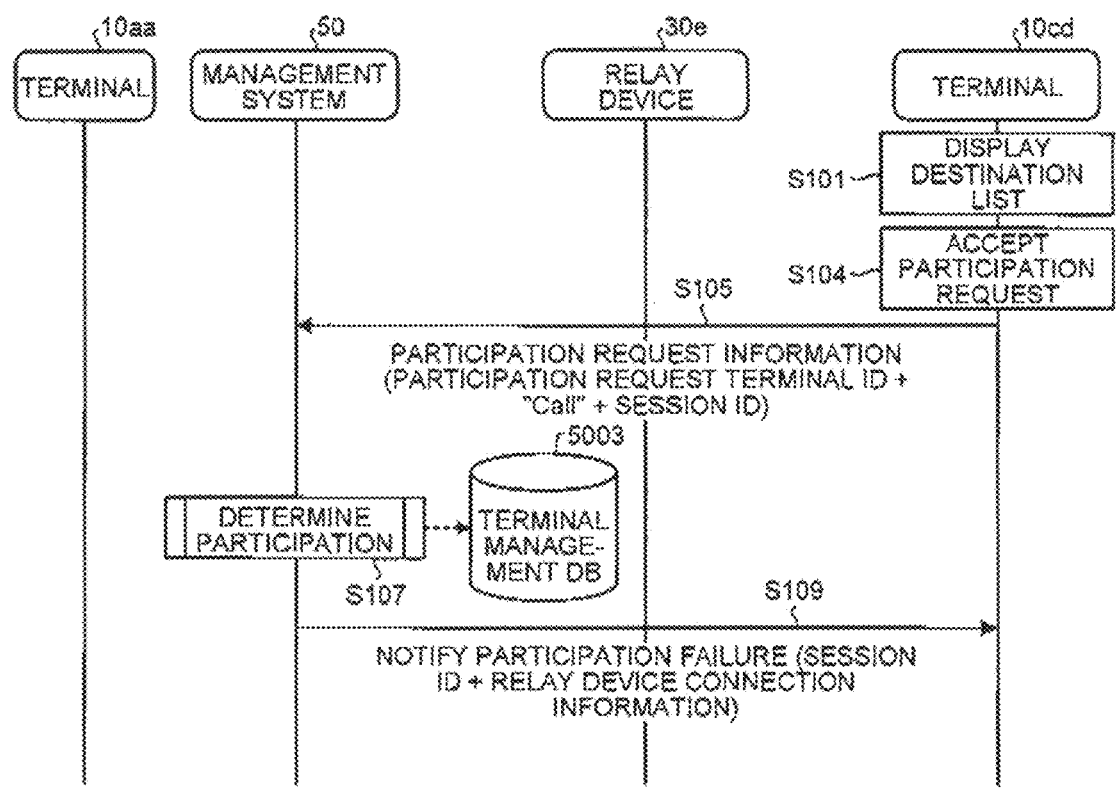
FIG. 33 is a sequence diagram illustrating a process of transmitting participation request information for a contents data session.
Figure 34:
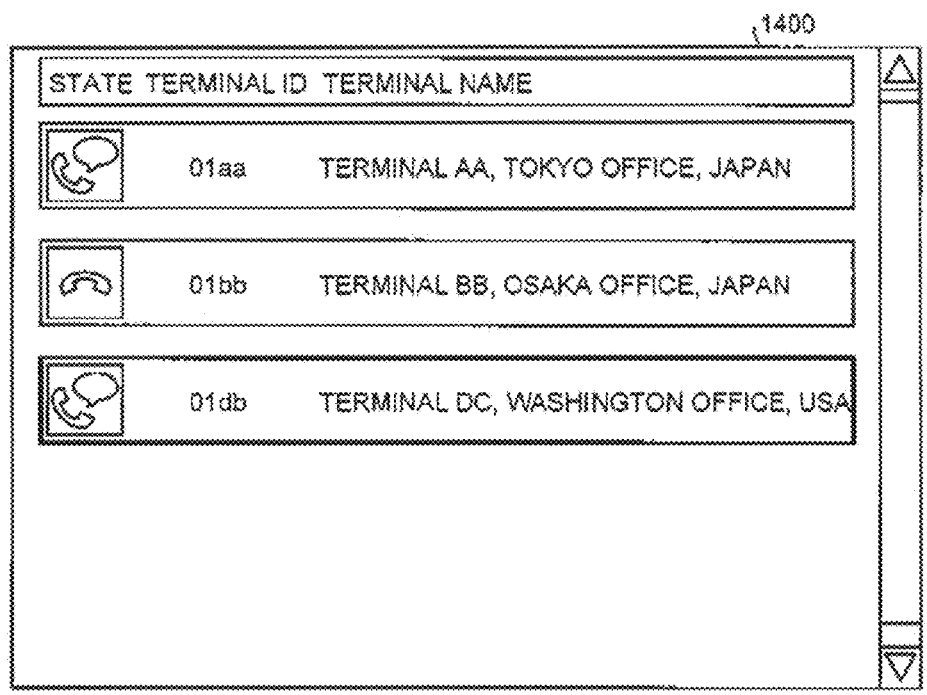
FIG. 34 is a diagram illustrating an example of displaying the destination list.
Figure 35:
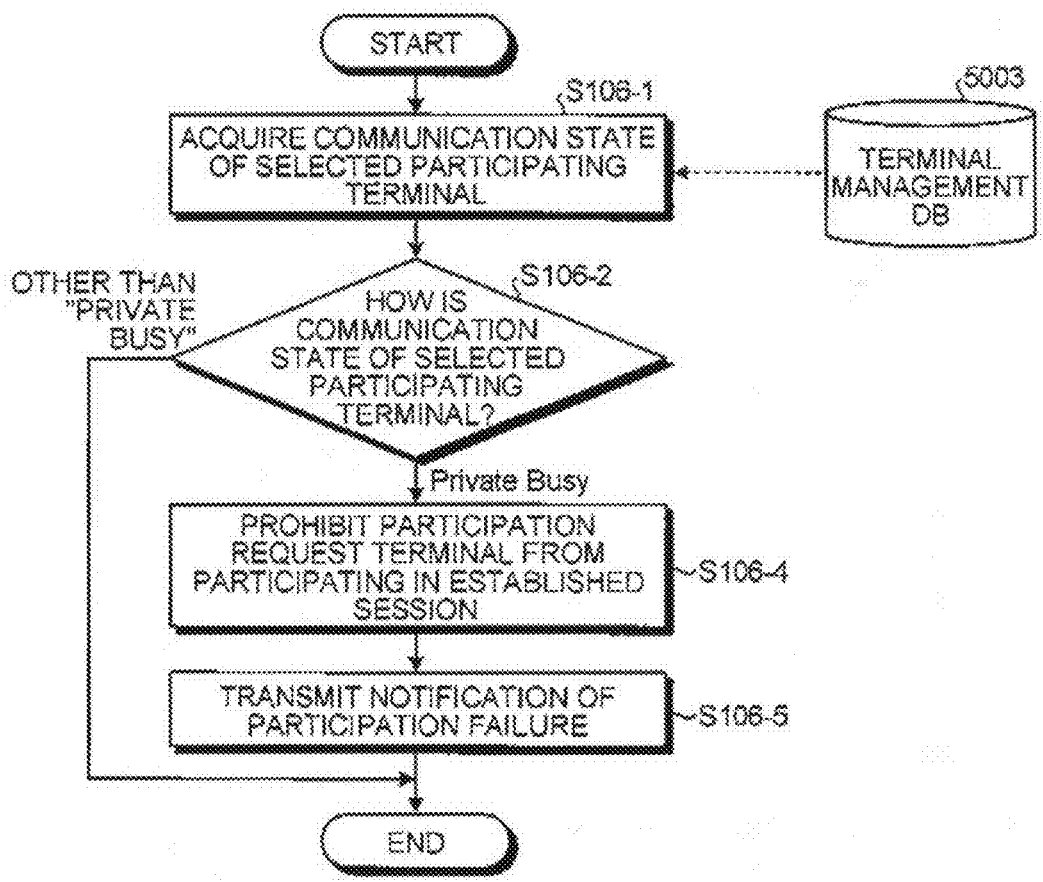
FIG. 35 is a processing flow chart illustrating a determining process of participation based on the communication state.
Figure 36:
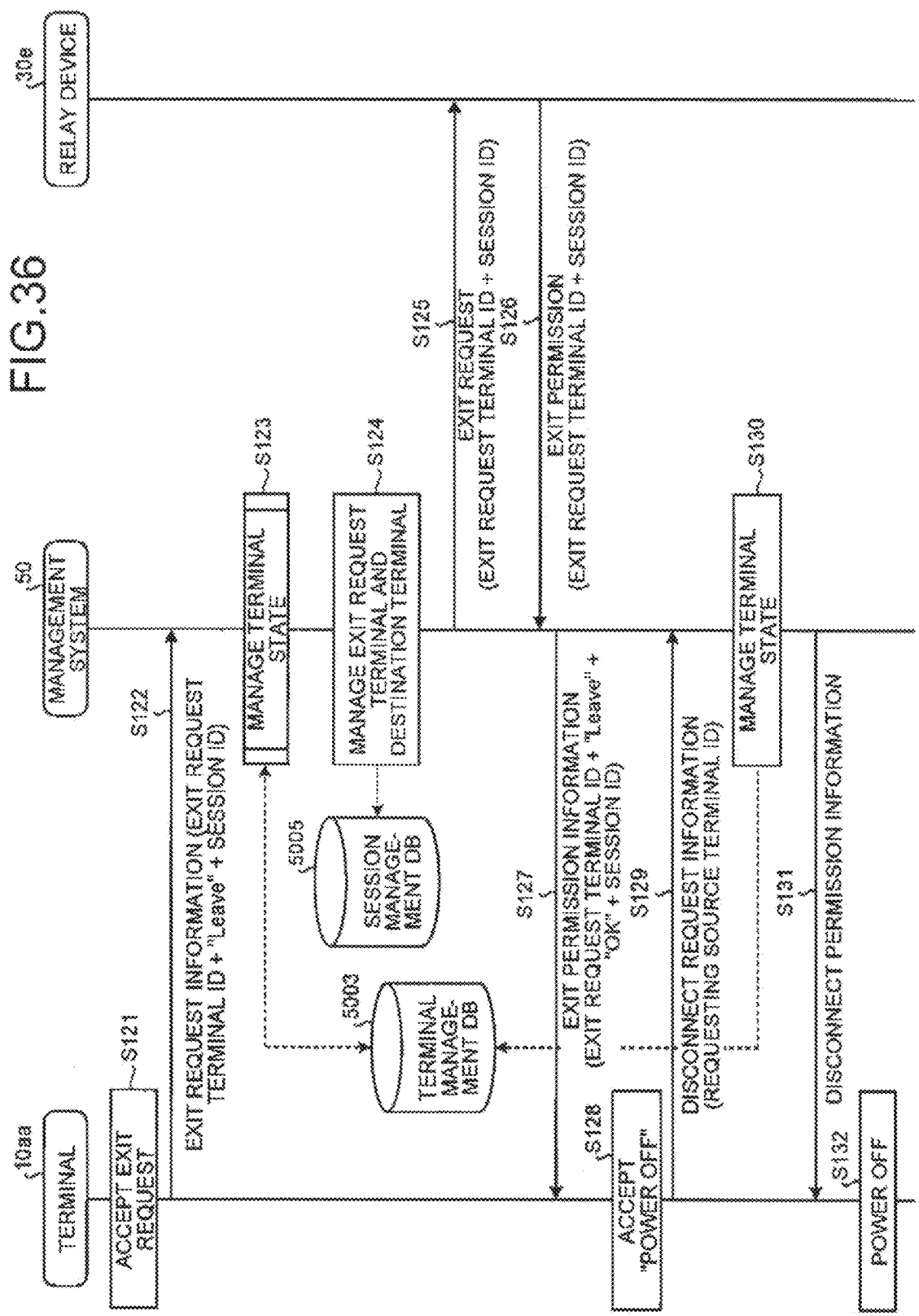
FIG. 36 is a sequence diagram illustrating a process of requesting exit from the contents data session.
Figure 37:
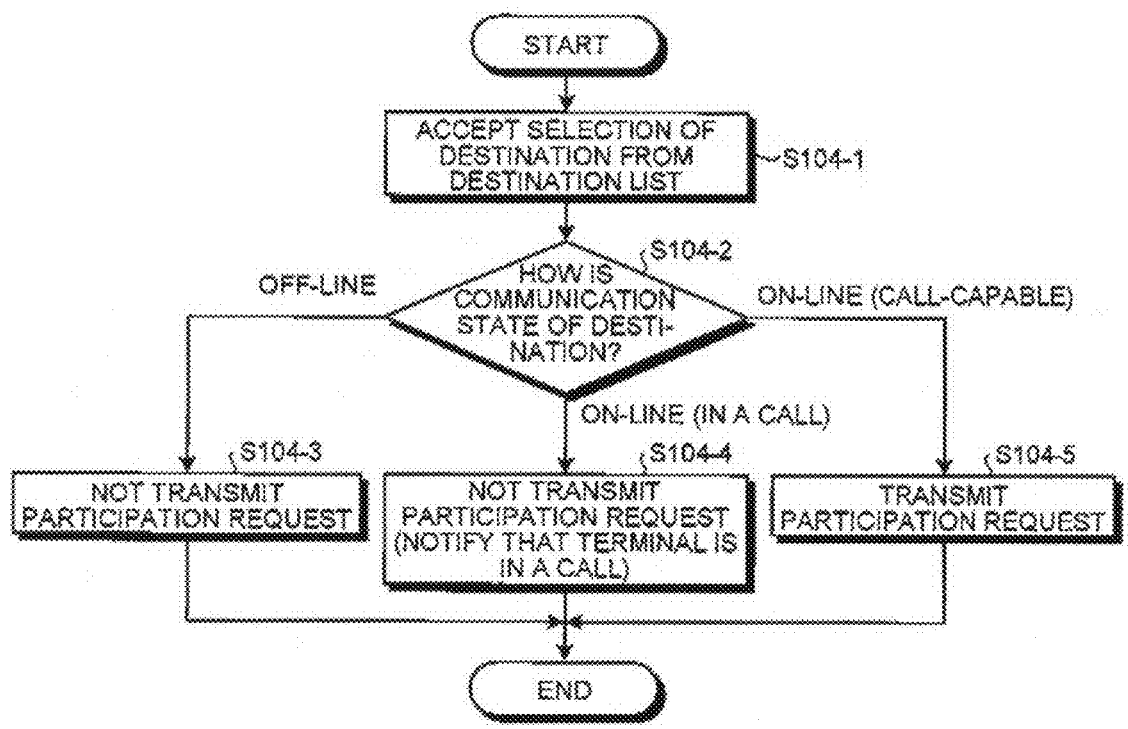
FIG. 37 is a flow chart illustrating a procedure of the participation determining process performed by a terminal.
Figure 38:
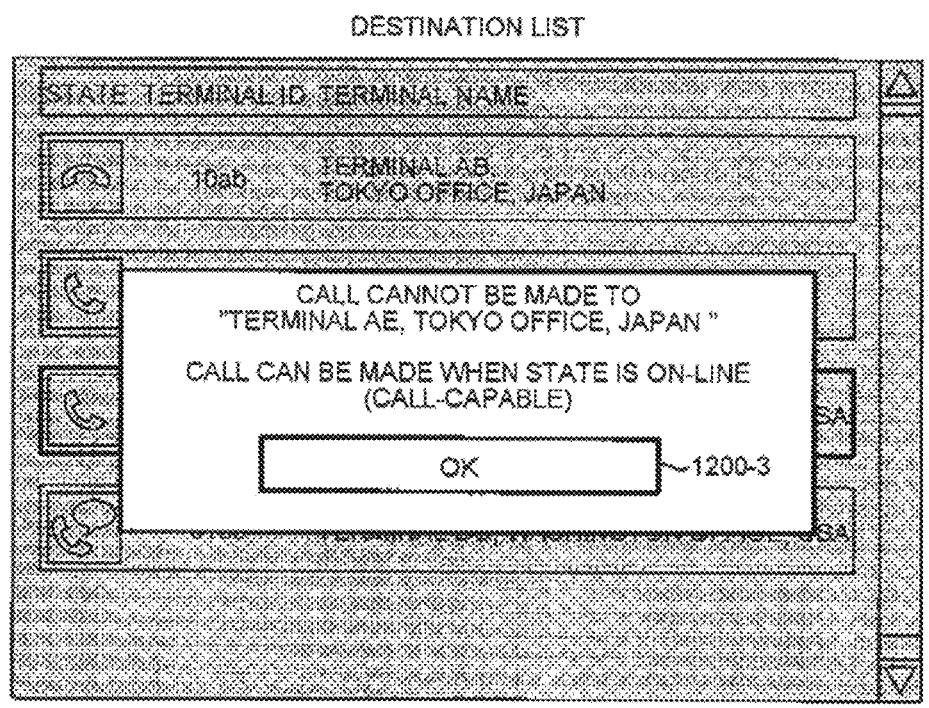
FIG. 38 is a diagram illustrating an example of a display screen indicating a message that a call cannot be made.

A configuration and a function (or unit) of the transmission system 1 according to the embodiment have been described above. Subsequently, a processing method in the transmission system 1 according to the embodiment will be described with reference to FIG. 20 to FIG. 38. FIG. 20 is a sequence diagram illustrating a process for managing the state information indicating an operating state of each relay device. FIG. 21 is a conceptual diagram illustrating a state of transmission/reception of image data, audio data, and various pieces of management information in the transmission system. FIG. 22 is a sequence diagram illustrating a process of preliminary stage of starting to make a call between terminals. FIG. 23 is a diagram illustrating an example of displaying the destination list of the embodiment. FIG. 24 is a sequence diagram illustrating a process of requesting to start communication. FIG. 25 is a flow chart illustrating a specific process of the start request terminal in a destination selecting process. FIG. 26 is a diagram illustrating an example of displaying a call confirmation dialog. FIG. 27 is a processing flow chart illustrating a process of changing communication state. FIG. 28 is a sequence diagram illustrating a process of permitting the request to start communication. FIG. 29 is a diagram illustrating an example of displaying a start request receiving screen. FIG. 30 is a sequence diagram illustrating a process of requesting to relay contents data. FIG. 31 is a processing flow chart illustrating a process of changing the communication state. FIG. 32 is a sequence diagram illustrating a process of transmit/receive contents data between the transmission terminals. FIG. 33 is a sequence diagram illustrating a process of transmitting participation request information for a contents data session. FIG. 34 is a diagram illustrating an example of displaying the destination list. FIG. 35 is a processing flow chart illustrating a determining process of participation based on communication state. FIG. 36 is a sequence diagram illustrating a process of requesting exit from the contents data session. FIG. 37 is a flow chart illustrating a procedure of the participation determining process performed by a terminal. FIG. 38 is a diagram illustrating an example of a display screen indicating a message that a call cannot be made.

Hereinafter, it is assumed that a session including restriction information that there is participation restriction is established and the other terminal requests to participate in the established session including the participation restriction.

With reference to FIG. 20, processing to manage state information indicating a state of each relay device 30 transmitted from each relay device 30 to the management system 50 will be described. In each relay device 30, the state detection unit 32 illustrated in FIG. 5 regularly detects an operating state of the relay device 30 as an own device (Steps S1-1 to S1-4). In order to cause the management system 50 to manage the operating state of each relay device 30 in real time, the communication unit 31 of each relay device 30 regularly transmits each piece of state information to the management system 50 via the communication network 2 (Steps S2-1 to S2-4). Each piece of the state information includes a relay device ID of each of the relay devices 30 and the operating state detected by the state detection unit 32 of the relay device 30 according to each relay device ID. As illustrated in FIG. 9, in the embodiment, the relay devices (30*a*, 30*b*, and 30*d*) are normally operated and in the "ON-line" state, while the relay device 30*c* is in operation but there is some trouble in a computer program for executing a relaying operation of the relay device 30*c*, so that the relay device 30*c* is in the "OFF-line" state.

Next, in the management system 50, the communication unit 51 receives each piece of state information transmitted from each relay device 30, and the state information is stored and managed per each relay device ID in the relay device management table (refer to FIG. 9) of the non-volatile storage unit 5000 via the storing/reading process unit 59 (Steps S3-1 to S3-4). Accordingly, any of the operating states such as "ON-line", "OFF-line", and "out of order" is stored and managed per each relay device ID in the relay device management table as illustrated in FIG. 9. Also in this case, a date of reception when the state information is received by the management system 50 is stored and managed per each relay device ID. If the state information is not transmitted from the relay device 30, a field of operating state in each record of the relay device management table and a field of date of reception illustrated in FIG. 9 are blanked out, or an operating state and a date of reception at the time of previous reception are indicated.

Next, a concept that indicates a state of transmission/reception of contents data and various pieces of management information in the transmission system 1 will be described with reference to FIG. 21. As illustrated in FIG. 21, in the transmission system 1, a session for management information sei for transmitting/receiving various pieces of management information is established via the management system 50 among the start request terminal, a destination terminal A, and a destination terminal B. Among the start request terminal, the destination terminal A, and the destination terminal B, four sessions for transmitting/receiving four pieces of data such as high-resolution image data, moderate-resolution image data, low-resolution image data, and audio data are established via the relay device 30. Herein, the four sessions are collectively referred to as a contents data session sed. That is, the contents data session sed is a session used for a television conference.

Next, transmission and reception processing of each piece of management information in the preliminary stage before the terminal 10aa starts to make a call will be described with reference to FIG. 22. FIG. 22 illustrates a process in which various pieces of management information are all transmitted or received by the session for management information sei.

When a user of the terminal 10aa turns on the power switch 109 illustrated in FIG. 2, the operation input receiving unit 12 illustrated in FIG. 5 receives "power ON" and turns on the power supply (Step S21). The login requesting unit 13 automatically transmits the login request information indicating the login request to the management system 50 from the communication unit 11 via the communication network 2, triggered by the reception of the "power ON" (Step S22). The login request information includes a terminal ID and a password for identifying the terminal 10aa that is an own terminal as a requesting source. These terminal ID and the password are data that is read out from the non-volatile storage unit 1000 via the storing/reading process unit 19 and transmitted to the communication unit 11. When the login request information is transmitted from the terminal 10aa to the management system 50, the management system 50 as a receiving side can grasp the IP address of the terminal 10aa as a transmitting side.

Next, the terminal authentication unit 52 of the management system 50 searches the terminal authentication management table of the non-volatile storage unit 5000 (refer to FIG. 10) using a terminal ID and a password included in the login request information received via the communication unit 51 as a search key, and determines whether the same terminal ID and the password are managed by the terminal authentication management DB 5002 to perform terminal authentication (Step S23).

Because the same terminal ID and the same password are managed by the terminal authentication unit 52, when it is determined that the login request is transmitted from the terminal 10aa having valid use authority, the state management unit 53 associates the date of reception when the login request information is received and the IP address of the terminal 10aa to be stored in the terminal management table (refer to FIG. 11) per record indicated by the terminal ID and the terminal name of the terminal 10aa (Step S24-1). Accordingly, in the terminal management table illustrated in FIG. 11, the terminal ID "01aa" is associated with the date of reception "2009. 11. 10. 13: 40" and the IP address of the terminal "1.2.1.3" to be managed.

Subsequently, the state management unit 53 sets the operating state "ON-line" and the communication state "None" of the terminal 10aa, and associates the operating state and the communication state with each record indicated by the terminal ID and the terminal name of the terminal 10aa to be stored in the terminal management table (refer to FIG. 11) (Step S24-2). Accordingly, in the terminal management table illustrated in FIG. 11, the terminal ID "01aa" is associated with the operating state "ON-line" and the communication state "None" to be managed.

The communication unit 51 of the management system 50 transmits authentication result information indicating an authentication result obtained by the terminal authentication unit 52 to the login request terminal (terminal 10aa) that has requested to login via the communication network 2 (Step S25). Hereinafter, the embodiment will subsequently describe a case where it is determined that the terminal has valid use authority by the terminal authentication unit 52.

When the terminal 10aa receives the authentication result information indicating a result that the terminal has the valid use authority, the communication unit 11 transmits destination list request information indicating to request the destination list to the management system 50 via the communication network 2 (Step S26). Accordingly, the communication unit 51 of the management system 50 receives the destination list request information.

Next, the terminal extraction unit 54 searches the destination list management table (refer to FIG. 12) using the terminal ID "01aa" of the login request terminal (terminal 10aa) that has requested login as a search key, and reads out and extracts the terminal ID of the destination terminal candidate to which the login request terminal (terminal 10aa) can make a call as a start request terminal, that is, establish a session (Step S27). In addition, the terminal extraction unit 54 searches the terminal management table (refer to FIG. 11) using the extracted terminal ID as a search key, and reads out and extracts a terminal name corresponding to the terminal ID, that is, a terminal name of the destination terminal candidate. Herein, terminal IDs ("01ab", "01ba", "01db", and "01dc") of destination terminal candidates (terminals (10ab, 10ba, 10db, and 10dc)) corresponding to the terminal ID "01aa" of the start request terminal (terminal 10aa) and terminal names corresponding thereto ("Terminal AB, Tokyo office, Japan", "Terminal BA, Osaka office, Japan", "Terminal DB, Washington office, USA", and "Terminal DC, Washington office, USA") are extracted.

Next, the communication unit 51 of the management system 50 reads out data of a destination list frame (data in the destination list frame 1100-1 illustrated in FIG. 23) from the non-volatile storage unit 5000 via the storing/reading process unit 59 (Step S28), and transmits "destination list information (a destination list frame, a terminal ID, and a terminal name)" including the destination list frame and the terminal ID and the terminal name of the destination terminal candidate extracted by the terminal extraction unit 54 to the start request terminal (terminal 10aa) (Step S29). Accordingly, in the start request terminal (terminal 10aa), the communication unit 11 receives the destination list information and the storing/reading process unit 19 stores the destination list information in the volatile storage unit 1002 (Step S30).

As described above, each terminal 10 does not manage the destination list information but the management system 50 centrally manages the destination list information of all of the terminals in the embodiment. Therefore, if a new terminal 10 is included in the transmission system 1 or a new type of terminal 10 is included instead of the already-included terminal 10, and if appearance of the destination list frame is to be changed, the management system 50 handles them in a collective manner. Therefore, labor to change the destination list information by each terminal 10 may be saved.

The terminal state acquiring unit 55 of the management system 50 searches the terminal management table (refer to FIG. 11) using terminal IDs ("01*ab*", "01*ba*", "01*db*", and "01*de*") of the destination terminal candidate extracted by the terminal extraction unit 54 as a search key, and reads out the corresponding operating state and the communication state per each terminal ID extracted by the terminal extraction unit 54 to acquire the operating state and the communication state of each of the terminals (10*ab*, 10*ba*, 10*db*, and 10*dc*) as the destination terminal candidates (Step S31).

Next, the communication unit 51 transmits state information including the terminal ID as the search key used in Step S31 and the operating state and the communication state of the corresponding destination terminal candidate to the login request terminal via the communication network 2 (Step S32). Specifically, in Step S32, the state information including the terminal ID "01*ab*" as the search key and the operating state "OFF-line" of the destination terminal candidate (terminal 10*ab*) is transmitted to the login request terminal (terminal 10*aa*). When the operating state is "OFF-line", the state information does not include the communication state. Similarly, as a part of Step S32, the communication unit 51 transmits pieces of state information for all of the destination terminal candidates, such as the terminal ID "01*ba*", the operating state "ON-line" of the corresponding destination terminal candidate (terminal 10*ba*), and the state information including the communication state "Private Calling", to the login request terminal (terminal 10*aa*).

Next, the storing/reading process unit 19 of the login request terminal (terminal 10*aa*) sequentially stores the state information received from the management system 50 in the volatile storage unit 1002 (Step S33). Therefore, the login request terminal (terminal 10*aa*) may receive the state information of each terminal described above to acquire the operating state and the communication state at that time of each terminal 10*ab* and the like as the destination terminal candidate that can make a call to the login request terminal (terminal 10*aa*) as the start request terminal.

Next, the destination list creating unit 20 of the login request terminal (terminal 10*aa*) creates a destination list reflecting the operating state and the communication state of the terminal 10 as the destination terminal candidate based on the destination list information stored in the volatile storage unit 1002 and the state information of the terminal. The display control unit 16 displays the destination list on a display 120*aa* illustrated in FIG. 1 at predetermined timing (Step S34).

FIG. 23 is a diagram illustrating an example of displaying the destination list. As illustrated in FIG. 23, the destination list is a display screen that includes the destination list frame 1100-1 including a terminal ID 1100-2 of the destination terminal candidate, a terminal name 1100-3, icons 1100-4*a* to 1100-4*c* reflecting the state information, and the like.

The icons include an OFF-line icon 1100-4*a* indicating the OFF-line state where a call cannot be made, a call-capable icon 1100-4*b* indicating the ON-line state where a call can be made, and a busy icon 1100-4*c* indicating the ON-line state but the line is busy.

When the operating state of the destination terminal candidate is "ON-line" and the communication state thereof is "None", the destination list creating unit 20 allocates the call-capable icon 1100-4*b* to the destination terminal candidate. When the operating state of the destination terminal candidate is "ON-line" and the communication state thereof is other than "None", the destination list creating unit 20 allocates the busy icon 1100-4*c* to the destination terminal candidate. In addition, when the operating state of the destination terminal candidate is "OFF-line", the destination list creating unit 20 allocates the OFF-line icon 1100-4*a* to the destination terminal candidate.

Returning back to FIG. 22, the terminal extraction unit 54 of the management system 50 searches the destination list management table (refer to FIG. 12) using the terminal ID "01*aa*" of the login request terminal (terminal 10*aa*) as a search key, and extracts a terminal ID of the other terminal (start request terminal) to which the terminal ID "01*aa*" of the login request terminal (terminal 10*aa*) is registered as the destination terminal candidate (Step S35). In the destination list management table illustrated in FIG. 12, terminal IDs of the other requesting source terminals to be extracted are "01*ab*", "01*ba*", "01*cb*", and "01*db*".

Next, the terminal state acquiring unit 55 of the management system 50 searches the terminal management table (refer to FIG. 11) using the terminal ID "01*aa*" of the login request terminal (terminal 10*aa*) as a search key, and acquires the operating state and the communication state of the login request terminal (terminal 10*aa*) (Step S36).

The communication unit 51 transmits the state information including the terminal ID "01*aa*" of the login request terminal (terminal 10*aa*), the operating state "ON-line", and the communication state "None" acquired in Step S36 to a terminal of which operating state is "ON-line" in the terminal management table (refer to FIG. 11) (herein, assuming that the operating state of the terminal 10*ba* and the terminal 10*db* is "ON-line") among the terminals (10*ab*, 10*ba*, 10*cb*, and 10*db*) according to the terminal IDs ("01*ab*", "01*ba*", "01*cb*", and "01*db*") extracted in Step S35 (Steps S37-1 and S37-2). Next, the terminal 10*ba* and the terminal 10*db* each displays the state information of the destination terminal candidate on the display 120 (Steps S38-1 and S38-2). When the communication unit 51 transmits the state information to the terminals (10*ba* and 10*db*), the communication unit 51 refers to an IP address of the terminal managed by the terminal management table illustrated in FIG. 11 based on the terminal IDs ("01*ba*", "01*db*"). Accordingly, the terminal ID "01*aa*", the operating state "ON-line", and the communication state "None" of the login request terminal (terminal 10*aa*) may be transmitted to each of the terminals (10*ba*, 10*db*) that can make a call to the login request terminal (terminal 10*aa*).

Similarly to Step S21, when the user turns on the power switch 109 illustrated in FIG. 2, the operation input receiving unit 12 illustrated in FIG. 5 receives "power ON" and performs processing similar to the processing in Steps S22 to S38-1, and S38-2 in the other terminal 10, so that description thereof will not be repeated.

Subsequently, processing in which a terminal requests to start communication with the other terminal will be described with reference to FIG. 24. FIG. 24 illustrates processing in which various pieces of management information are all transmitted/received by the session for management information sei.

FIG. 24 illustrates an example in which the terminal 10*aa* that is allowed to login in FIG. 22 transmits the start request information, that is, an example in which the terminal 10*aa* operates as the start request terminal. The terminal 10*aa* as the start request terminal can communicate with at least one of the terminals of which operating state is "ON-line" and the communication state is "None" among the destination terminal candidates, based on the state information of the destination terminal candidate received in Step S32 illustrated in FIG. 22.

In the embodiment, the start request terminal (terminal 10*aa*) can make a call to the terminal 10*db* of which operating state is "ON-line" and the communication state is "None" according to the state information of the terminal received in Step S32 among the terminals (10*ab*, 10*ba*, 10*db*, and 10*dc*) as the destination terminal candidates. Hereinafter, a case where the user of the start request terminal (terminal 10*aa*) selects to start to make a call to the destination terminal (terminal 10*db*) will be described.

In a state before the processing illustrated in FIG. 24 is started, the destination list illustrated in FIG. 23 is displayed on the display 120*aa* of the terminal 10*aa* as the start request terminal. The user of the start request terminal may select a desired call partner, that is, a session partner from the destination list.

In the processing illustrated in FIG. 24, first, a user of the start request terminal pushes the operation button 108 illustrated in FIG. 2 to select the destination terminal (terminal 10*db*), and a destination selection process is performed (Step S41).

FIG. 25 is a flow chart illustrating a specific process of the start request terminal in the destination selection process (Step S41). As described above, when the user pushes the operation button 108 to select the destination terminal (10*db*) with respect to the destination list, the operation input receiving unit 12 illustrated in FIG. 5 accepts a request to start to make a call of which destination terminal (terminal 10*db*) is designated, that is, the start request of the session (Step S41-1). Next, the display control unit 16 displays a call confirmation dialog 1200-1 illustrated in FIG. 26 as being superimposed on the destination list (Step S41-2).

The call confirmation dialog 1200-1 is a user interface for designating to confirm the start request received in Step S41-1. The call confirmation dialog 1200-1 includes a "Yes" button 1200-2 for deciding the transmission of the start request information and a "No" button 1200-3 for cancelling the transmission of the start request information.

In the embodiment, it is assumed to establish a session having participation restriction, so that there is no item to designate whether to restrict a terminal that participates in a session corresponding to the start request. However, if it is allowed to establish a session having no participation restriction, for example, a button "to make a call with participant restriction" may be provided.

If the "Yes" button 1200-2 is selected, the communication unit 11 generates the start request information including the restriction information of having participation restriction (Step S41-3). The start request information generated in Step S41-3 includes "Private Invite" that is information of requesting to start and the restriction information of having participation restriction, the terminal ID "01*aa*" of the start request terminal, and the terminal ID "01*db*" of the destination terminal.

Returning back to FIG. 24, the communication unit 11 of the terminal 10*aa* transmits the start request information, including the terminal ID "01*aa*" of the start request terminal (terminal 10*aa*), the terminal ID "01*db*" of the destination terminal (terminal 10*db*), and "Private Invite" including the restriction information of having participation restriction and indicating to request to start, to the management system 50 along with the IP address of the start request terminal (Step S42). Accordingly, the communication unit 51 of the management system 50 receives the start request information and grasps the IP address "1.2.1.3" of the start request terminal (terminal 10*aa*) as the transmission source.

On the basis of the terminal ID "01*aa*" of the start request terminal (terminal 10*aa*) included in the start request information and the terminal ID "01*db*" of the destination terminal (terminal 10*db*), the state management unit 53 changes a field of communication state of a record including each of the terminal ID "01*aa*" and the terminal ID "01*db*" in the terminal management table of the terminal management DB 5003 (refer to FIG. 11) (Step S43).

A process of Step S43 will be described in detail with reference to FIG. 27. First, the state management unit 53 illustrated in FIG. 5 acquires a communication state of a terminal managed by the terminal management DB 5003 (Step S43-1). In this case, "Private Invite" included in the start request information received by the communication unit 51 is specified as the change request information of the communication state. The change request information "Private Invite" is determined to be a specific piece of change request information by the change request information determination unit 61 in advance. Based on the above, the state management unit 53 acquires the communication state not only of the start request terminal (terminal 10*aa*) but also of the destination terminal (terminal 10*db*). In this case, the state management unit 53 searches the terminal management table (refer to FIG. 11) using the terminal ID "01*aa*" of the start request terminal (terminal 10*aa*) as a search key, and acquires the communication state "None" of the start request terminal (terminal 10*aa*) that has transmitted the start request information. Similarly, the communication state "None" of the destination terminal (terminal 10*db*) is acquired.

Next, the state management unit 53 acquires state-before-change information of the start request terminal and the destination terminal corresponding to the change request information "Private Invite" (Step S43-2). In this case, the state management unit 53 searches the state change management table (refer to FIG. 17) using the change request information "Private Invite" and the terminal information "start request terminal" as a search key, and acquires the state-before-change information "None" of the start request terminal. Similarly, the state management unit 53 searches the state change management table (refer to FIG. 17) using the change request information "Private Invite" and the terminal information "destination terminal" as a search key, and acquires the state-before-change information "None" of the destination terminal.

Next, the state management unit 53 compares the acquired communication state with the acquired state-before-change information to determine whether they are the same (Step S43-3). In this case, the state management unit 53 compares the acquired communication state "None" of the start request terminal (terminal 10*aa*) with the acquired state-before-change information "None" of the start request terminal to determine whether they are the same. Similarly, the state management unit 53 compares each of the acquired communication states of the destination terminal (terminal 10*db*) with the acquired state-before-change information of the destination terminal to determine whether they are the same.

When it is determined in Step S43-3 that the communication state and the state-before-change information of the start request terminal are the same, and the communication state and the state-before-change information of the destination terminal are the same (Yes at Step S43-3), the state management unit 53 acquires the change information of the start request terminal and the destination terminal corresponding to the change request information "Private Invite" (Step S43-4). In this case, the state management unit 53 searches the state change management table (refer to FIG. 17) using the change request information "Private Invite" and the terminal information "start request terminal" as a search key, and acquires the change information "Private Calling" of the start request terminal. Similarly, the state management unit 53 searches the state change management table (refer to FIG. 17) using the change request information "Private Invite" and the terminal information "destination terminal" as a search key, and acquires the change information "Private Ringing" of the destination terminal.

Next, on the basis of the terminal ID "01aa" of the start request terminal (terminal 10aa) and the terminal ID "01db" of the destination terminal (terminal 10db), the state management unit 53 changes a field of communication state of a record including each of the terminal ID "01aa" and the terminal ID "01db" in the terminal management table (refer to FIG. 11) (Step S43-5). In this case, the field of communication state of the record including the terminal ID "01aa" of the terminal management table is changed to "Private Calling" based on the acquired change information of the start request terminal. Similarly, the field of communication state of the record including the terminal ID "01db" is changed to "Private Ringing" based on the acquired change information of the destination terminal.

When it is determined in Step S43-3 that the communication state and the state-before-change information of the requesting source terminal are not the same, or the communication state and the state-before-change information of the destination terminal are not the same (No at Step S43-3), the state management unit 53 does not change the field of communication state of the record including each of the terminal ID "01aa" and the terminal ID "01db" in the terminal management table (refer to FIG. 11). This is because any of the start request terminal (terminal 10aa) and the destination terminal (terminal 10db) is in a state where a call cannot be started. In this case, the communication unit 51 creates a predetermined error message and transmits the error message to the start request terminal (terminal 10aa) to complete the process (Step S43-6). In this case, the error message is displayed on the display 120 in the start request terminal.

Returning back to FIG. 24, a subsequent process to the change of the communication state in Step S43-5 will be described. First, the session ID generation unit 56a generates a session ID "se1" for identifying a session (contents data session sed) for executing communication with the destination terminal requested by the start request terminal (terminal 10aa) (Step S44). When the session ID is generated, the session management unit 57 stores the session ID "se1" in the volatile storage unit 5100.

Subsequently, the relay device selection unit 56 of the management system 50 selects the relay device 30 for relaying the contents data in the contents data session sed between the start request terminal (terminal 10aa) and the destination terminal (terminal 10db) (Step S45). In this case, first, the relay device extraction unit 56b searches the relay device selection management table (refer to FIG. 15) based on the terminal ID "01aa" of the start request terminal (terminal 10aa) and the terminal ID "01db" of the destination terminal (terminal 10db) included in the start request information transmitted from the start request terminal (10aa) to extract the relay device IDs ("111a" and "111d") corresponding to the terminals (10aa and 10db).

If the extracted relay device IDs are the same, the selection unit 56c refers to the operating state of the extracted relay device ID among the operating states of the relay device 30 managed by the relay device management table (refer to FIG. 9). If the operating state of the relay device ID is "ON-line", the selection unit 56c selects the extracted relay device as a relay device for relaying the contents data. When the extracted relay device IDs are not the same or the operating state of the relay device ID is "OFF-line" as a result of the reference, the relay device 30e of the relay device ID "111e" is selected as the relay device for relaying the contents data. The embodiment will subsequently describe a case where the relay device 30e is selected by the selection unit 56c.

When a selection process of the relay device 30 is completed, in the session management table of the non-volatile storage unit 5000 (refer to FIG. 13), the session management unit 57 stores and manages the relay device ID "111e" of the selected relay device, the terminal ID "01aa" of the start request terminal (terminal 10aa), and the terminal ID "01db" of the destination terminal (terminal 10db) in fields of the relay device ID, the terminal ID of the start request terminal, and the terminal ID of the destination terminal of a record including the session ID "se1" (Step S46).

Next, the communication unit 51 illustrated in FIG. 5 transmits the session ID generated in the session ID generation unit 56a and relay device connection information used for connecting to the relay device 30e selected by the selection unit 56c to the start request terminal (terminal 10aa) via the communication network 2 (Step S47). The relay device connection information may include the IP address "1.1.1.3" of the relay device 30e, authentication information, a port number, and the like. Accordingly, in executing the session of the session ID "se1", the terminal 10aa can grasp the relay device connection information used for connecting to the relay device 30e that is used to relay the contents data.

Next, the communication unit 51 transmits the terminal ID "01aa" of the start request terminal (terminal 10aa), "Private Invite", the start request information including the session ID "se1", the relay device connection information used for connecting to the relay device 30e, and the IP address of the management system 50 to the destination terminal (terminal 10db) (Step S48). Accordingly, the communication unit 11 of the destination terminal (terminal 10db) receives the start request information, and grasps the relay device connection information used for connecting to the relay device 30e that is used to relay the contents data and the IP address "1.1.1.2" of the management system 50 as the transmission source.

Subsequently, with reference to FIG. 28 and FIG. 27, the following describes processing in which a user of the destination terminal (terminal 10db) that has received the start request information pushes the operation button 108 illustrated in FIG. 2, so that a response to allow the start of communication with the start request terminal (terminal 10aa) (session establishment) is received.

When the transmission and reception processing illustrated in FIG. 28 is started, a start request reception screen indicating of receiving the start request information is displayed on the display 120db of the destination terminal (terminal 10db) (Step S49-1). As illustrated in FIG. 29, a start request receiving screen 1300-1 indicates that the start request information is received. In addition, when the start request information includes the restriction information of having participation restriction, the start request receiving screen 1300-1 indicates that there is the participation restriction such that "This conference has participation restriction".

A user can confirm that the start request is received by viewing the start request reception screen, and also confirm whether the television conference according to a session that has been requested to start is a participation-restricted conference that is designated to have participation restriction. In the embodiment, it is assumed that there is participation restriction, so that it is not necessary to indicate that there is participation restriction.

By operation of the operation button 108 of the destination terminal (terminal 10db) by a user of the destination terminal, the operation input receiving unit 12 receives a response to allow the start of communication (session establishment) with the start request terminal (terminal 10aa) (Step S49-2). Next, the communication unit 11 of the destination terminal (terminal 10db) transmits start response information including the terminal ID "01db" of the destination terminal (terminal 10db), the terminal ID "01aa" of the start request terminal (terminal 10aa), the change request information "Accept" indicating to allow the session establishment, and the session ID "se1" to the management system 50 (Step S50).

When the communication unit 51 of the management system 50 receives the start response information, the state management unit 53 changes a field of communication state of a record including each of the terminal ID "01aa" and the terminal ID "01db" in the terminal management table (refer to FIG. 11) based on the terminal ID "01aa" of the requesting source terminal (terminal 10aa) and the terminal ID "01db" of the destination terminal (terminal 10db) (Step S51).

A process of Step S51 will be described in detail with reference to FIG. 27. First, when the communication unit 51 of the management system 50 receives the start response information, the state management unit 53 acquires a communication state of a terminal managed by the terminal management table (refer to FIG. 11) similarly to the process of Step S43-1 (Step S51-1). In this case, the change request information "Accept" received by the communication unit 51 is determined to be a specific piece of change request information by the change request information determination unit 61 in advance. Based on this, the state management unit 53 acquires not only the communication state "Private Ringing" of the destination terminal (terminal 10db) but also the communication state "Private Calling" of the start request terminal (terminal 10aa).

Subsequently, the state management unit 53 acquires the state-before-change information "Private Calling" and "Private Accepted" of the start request terminal corresponding to the change request information "Accept" managed by the state change management table (refer to FIG. 17), similarly to the process of Step S43-2.

Similarly, the state management unit 53 acquires the State-before-change information "Private Ringing" of the destination terminal corresponding to the change request information "Accept" managed by the state change management table (refer to FIG. 17) (Step S51-2).

Next, the state management unit 53 compares the acquired communication state with the acquired state-before-change information to determine whether they are the same (Step S51-3). In this case, the state management unit 53 determines whether the acquired communication state "Private Calling" of the start request terminal (terminal 10aa) is the same as any of the state-before-change information "Private Calling" and "Private Accepted" of the start request terminal. Similarly, the state management unit 53 determines whether the acquired communication state "Private Ringing" of the destination terminal (terminal 10db) is the same as the state-before-change information "Private Ringing" of the destination terminal.

When it is determined in Step S51-3 that the communication state and the state-before-change information of the start request terminal are the same and the communication state and the state-before-change information of the destination terminal are the same (Yes at Step S51-3), the state management unit 53 acquires change information of the start request terminal and the destination terminal corresponding to response information "Accept" (Step S51-4). In this case, the state management unit 53 searches the state change management table (refer to FIG. 17) using the response information "Accept", the terminal information "start request terminal" indicating the start request terminal, and a state-before-change information "Private Calling" indicating the communication state before the start request terminal is changed as a search key, and each acquires the change information "Private Accepted" of the start request terminal. Similarly, the state management unit 53 searches the state change management table (refer to FIG. 17) using the response information "Accept", the terminal information "destination terminal" indicating the destination terminal, and the state-before-change information "Private Ringing" indicating the communication state before the destination terminal is changed as a search key, and acquires the change information "Private Accepted" of the destination terminal.

Next, on the basis of the terminal ID "01aa" of the start request terminal (terminal 10aa) and the terminal ID "01db" of the destination terminal (terminal 10db) included in the start response information, the state management unit 53 changes a field of communication state of a record including each of the terminal ID "01aa" and the terminal ID "01db" in the terminal management table (refer to FIG. 11) (Step S51-5). In this case, a field of communication state of a record including the terminal ID "01aa" of the terminal management table is changed to "Private Accepted" based on the acquired change information of the start request terminal. Similarly, a field of communication state of a record including the terminal ID "01db" of the terminal management table is changed to "Private Accepted" based on the acquired change information of the destination terminal.

When it is determined in Step S51-3 that the communication state and the state-before-change information of the start request terminal (10aa) are not the same or the communication state and the state-before-change information of the destination terminal (terminal 10db) are not the same (No at Step S51-3), the state management unit 53 does not change a field of communication state of a record including each of the terminal ID "01aa" and the terminal ID "01db" in the terminal management table (refer to FIG. 11). In this case, the communication unit 51 completes the process by generating the error message and transmitting the error message to the destination terminal (terminal 10db) (Step S51-6).

Next, returning back to FIG. 28, a subsequent process to the change of the communication state in Step S51-5 will be described. The communication unit 51 transmits the start response information including the terminal ID "01db" of the destination terminal (terminal 10db), the change request information "Accept" indicating to allow the request of starting a call with the destination terminal, and the session ID "se1" to the start request terminal (terminal 10aa) (Step S52). When receiving the start response information, the start request terminal (terminal 10aa) transmits the session ID "se1" and the relay device connection information acquired in Step S47 to the relay device 30e by the communication unit 11, and connects to the relay device 30e (Step S53). The destination terminal (terminal 10db) transmits the session ID "se1" and the relay device connection information acquired in Step S48 to the relay device 30e by the communication unit 11, and connects to the relay device 30e (Step S54).

Subsequently, a process in which the relay device 30e starts to relay the contents data transmitted between the start request terminal (terminal 10aa) and the destination terminal (terminal 10db) will be described with reference to FIG. 30. FIG. 30 illustrates a process in which various pieces of management information are transmitted/received all by the session for management information sei.

At a predetermined timing after connecting to the relay device 30e (refer to Step S53), the start request terminal (terminal 10aa) first transmits relay request information including the terminal ID "01aa" of the start request terminal (terminal 10aa), the session ID "sel", and the change request information "Join" indicating to request the start of relaying, to the management system 50 by the communication unit 11 (Step S71-1).

When the communication unit 51 of the management system 50 receives the relay request information, the state management unit 53 changes a field of communication state of a record including the terminal ID "01aa" in the terminal management table (refer to FIG. 11) based on the terminal ID "01aa" of the start request terminal (terminal 10aa) included in the relay request information (Step S72-1).

Herein, the process of Step S72-1 will be described in detail with reference to FIG. 31. In FIG. 31, the start request terminal is referred to as a relay request terminal as a transmission source of the relay request information. First, the state management unit 53 illustrated in FIG. 5 acquires the communication state of a terminal managed by the terminal management DB 5003 (Step S72-1-1). In this case, the change request information determination unit 61 determines that the change request information "Join" received by the communication unit 51 is not a specific piece of change request information in advance. Based on the above, the state management unit 53 acquires only the communication State of the relay request terminal (terminal 10aa). In this case, the state management unit 53 searches the terminal management table (refer to FIG. 11) using the terminal ID "01aa" of the relay request terminal (terminal 10aa) as a search key, and acquires the communication state "Private Accepted" of the relay request terminal (terminal 10aa) that has requested to start the relay.

Next, the state management unit 53 acquires the state-before-change information corresponding to the change request information "Join" (Step S72-1-2). In this case, the state management unit 53 searches the state change management table (refer to FIG. 16) using the change request information "Join" as a search key, and acquires the state-before-change information "Private Accepted".

Next, the state management unit 53 compares the acquired communication state with the acquired state-before-change information to determine whether they are the same (Step S72-1-3). In this case, the state management unit 53 compares the acquired communication state "Private Accepted" of the relay request terminal (terminal 10aa) with the state-before-change information "Private Accepted" acquired by the state management unit 53 to determine whether they are the same.

When it is determined in Step S72-1-3 that the communication state and the state-before-change information of the relay request terminal are the same (Yes at Step S72-1-3), the state management unit 53 acquires the change information corresponding to the change request information "Join" (Step S72-1-4). In this case, the state management unit 53 searches the state change management table (refer to FIG. 16) using the change request information "Join" as a search key, and acquires the change information "Private Busy".

Next, the state management unit 53 changes a field of the communication state of a record including the terminal ID "01aa" in the terminal management table (refer to FIG. 11) based on the terminal ID "01aa" of the start request terminal (terminal 10aa) (Step S72-1-5). In this case, the field of communication state of the record including the terminal ID "01aa" of the terminal management table is changed to "Private Busy" based on the acquired change information.

When it is determined in Step S72-1-3 that the communication state and the state-before-change information of the requesting source terminal are not the same (No at Step S72-1-3), the state management unit 53 does not change the field of communication state of the record including the terminal ID "01aa" in the terminal management table (refer to FIG. 11). In this case, the communication unit 51 completes the process by transmitting the error message to the start request terminal (terminal 10aa) (Step S72-1-6).

Next, returning back to FIG. 30, a subsequent process to the change of the communication state in Step S72-1-5 will be described. First, the management system 50 transmits relay start request information including the terminal ID "01aa" of the relay request terminal (terminal 10aa) and the session ID "sel" to the relay device 30e (Step S73-1). When receiving the relay start request information, the relay device 30e transmits relay start permission information including notification information "OK" indicating to permit the start of relaying to the management system 50 (Step S74-1). When receiving such a response, the communication unit 51 of the management system 50 transmits the relay start permission information to the relay request terminal (terminal 10aa) (Step S75-1). Accordingly, the contents data session sed between the relay request terminal (terminal 10aa) and the relay device 30e is established (Step S76-1).

At a predetermined timing after connecting to the relay device 30e (refer to Step S54 of FIG. 28), the destination terminal (terminal 10db) transmits the relay request information including the terminal ID "01db" of the destination terminal (terminal 10db), the session ID "se1", and the change request information "Join" indicating to request the start of relaying, to the management system 50 by the communication unit 11 (Step S71-2).

Subsequently, the management system 50 and the relay device 30e performs a process similar to that of Step S72-1, S73-1, S74-1, and S75-1, so that the contents data session sed between the destination terminal (terminal 10db) and the relay device 30e is established (Steps S72-2, S73-2, S74-2, S75-2, and S76-2). In Step S72-2, the destination terminal is treated as a transmission source of the relay request information, that is, a relay request terminal. When the contents data session sed between the relay request terminal (terminal 10aa) and the relay device 30e and the contents data session sed between the destination terminal (terminal 10db) and the relay device 30e are established, the relay device 30e can relay three pieces of image data such as of low-resolution, moderate-resolution, and high-resolution, and audio data between the terminals (10aa and 10db). Accordingly, the terminals (10aa and 10db) can start the television conference.

Subsequently, a process for transmitting/receiving the contents data so as to make a call for the television conference between the start request terminal (terminal 10aa) and the destination terminal (terminal 10db) will be described with reference to FIG. 5 and FIG. 32. A Process of transmitting/receiving the contents data and a process of detecting delay time (described later) are the same in both the process of unidirectionally transmitting the contents data from the terminal 10aa to the terminal 10db and the opposite process of transmitting the contents data from the terminal 10db to the terminal 10aa, so that the former will be described and the description about the latter will not be provided.

First, the start request terminal (terminal 10aa) transmits image data of a subject imaged by the image capturing unit 14 and audio data of an audio input by the audio input unit 15a from the communication unit 11 to the relay device 30e via the communication network 2, by the contents data session sed (Step S81). In the embodiment, image data of high image quality including low-resolution, moderate-resolution, and high-resolution images illustrated in FIG. 21, and audio data are transmitted. Accordingly, the relay device 30e receives the image data of the above three types of resolution and the audio data by the communication unit 31.

The data quality validation unit 33 searches the changed quality management table (refer to FIG. 7) using the IP address "1.3.2.4" of the destination terminal (terminal 10db) as a search key, and extracts the image quality of the corresponding image data to be relayed to validate the image quality of the image data to be relayed (Step S82). In the embodiment, quality of the image of the validated image data is "high image quality", and is the same as the image quality of the image data received by the communication unit 31. Therefore, the relay device 30e transfers the image data of unchanged image quality and the audio data of unchanged sound quality to the destination terminal (terminal 10db) by the contents data session sed (Step S83). Accordingly, the destination terminal (terminal 10db) receives the contents data by the communication unit 11, the display control unit 16 displays an image based on the image data on the display 120, and the audio output unit 15b may output a voice based on the audio data.

Next, the delay detection unit 18 of the terminal 10db detects delay time in receiving the image data received by the communication unit 11 at regular intervals (for example, per 1 second) (Step S84). The embodiment will describe a case where the delay time is 200 (ms).

The communication unit 11 of the destination terminal (terminal 10db) transmits delay information indicating the delay time "200 (ms)" to the management system 50 via the communication network 2 by the session for management information sei (Step S85). Accordingly, the management system 50 grasps the delay time and also grasps the IP address "1.3.2.4" of the terminal 10db as a transmission source of the delay information.

Next, the delay time management unit 60 of the management system 50 searches the terminal management table (refer to FIG. 11) using the IP address "1.3.2.4" of the destination terminal (terminal 10db) as a search key to extract the corresponding terminal ID "01db", and stores and manages the delay time "200 (ms)" indicated by the delay information in a field of delay time in a record of the terminal ID "01db" in the session management table (refer to FIG. 13) (Step S86).

Next, the quality determination unit 58 searches the quality management table (refer to FIG. 14) using the delay time "200 (ms)" as a search key, and extracts the image quality "moderate image quality" of the corresponding image data to determine the image quality as "moderate image quality" (Step S87).

Next, the communication unit 51 searches the relay device management table (refer to FIG. 9) using the relay device ID "111e" associated with the terminal ID "01db" as a search key in the session management table (refer to FIG. 13), and extracts the IP address "1.1.1.3" of the corresponding relay device 30e (Step S88).

The communication unit 51 transmits the quality information indicating the image quality "moderate image quality" of the image data determined by Step S87 to the relay device 30e via the communication network 2, by the session for management information sei (Step S89). The quality information includes the IP address "1.3.2.4" of the destination terminal (terminal 10db) used as a search key in Step S86. Accordingly, in the relay device 30e, the changed quality management unit 34 associates the IP address "1.3.2.4" of the terminal 10 as a destination (herein, a destination terminal (terminal 10db)) with the image quality "moderate image quality" of the image data to be relayed to be stored and managed in the changed quality management table (refer to FIG. 7) (Step S90).

Subsequently, similarly to Step S81, the terminal 10aa transmits the image data of high image quality including low image quality, moderate image quality, and high image quality, and the audio data to the relay device 30e by the contents data session sed (Step S91). Accordingly, in the relay device 30e, similarly to Step S82, the data quality validation unit 33 searches the changed quality management table (refer to FIG. 7) using the IP address "1.3.2.4" of the destination terminal (terminal 10db) as a search key, and extracts the image quality "moderate image quality" of the corresponding image data to be relayed to validate image quality of the image data to be relayed (Step S92).

In the embodiment, the image quality of the validated image data is "moderate image quality" that is lower than the image quality "high image quality" of the image data received by the communication unit 31. Therefore, the data quality changing unit 35 lowers the image quality of the image data from "high image quality" to "moderate image quality" to change the image quality of the image data (Step S93). The communication unit 31 transmits the image data of which image quality is changed to "moderate image quality" as described above and audio data of which sound quality is not changed, to the terminal 10db via the communication network 2 by the contents data session sed (Step S94). As described above, when the data reception is delayed in the destination terminal (terminal 10db) that receives the image data, the relay device 30e changes the quality of the image so that the participants in the television conference do not have a sense of discomfort.

During the television conference, whether the television conference uses a session with participation restriction or the television conference uses a session without participation restriction may be displayed on the display 120 of the terminal 10 participating in the television conference, that is, the terminal 10 participating in the established session so that the participant can recognize whether there is participation restriction in the television conference.

Subsequently, with reference to FIG. 33, described is a process in which, after a contents data session is established between the start request terminal (terminal 10aa) and the destination terminal (terminal 10db), the terminal 10cb transmits participation request information that requests to participate in the contents data session. That is, the terminal 10cb operates as a participation request terminal that transmits the participation request information. FIG. 33 illustrates a process of transmitting/receiving various pieces of management information all by the session for management information sei.

When a user desires to participate in the established session that has been already established to participate in the television conference using this session, the user causes the display 120cd of the terminal 10cd to display the destination list by the login process that has been described with reference to FIG. 22 in an own terminal to be used (in this case, the terminal 10cb) (Step S101).

As illustrated in FIG. 34, the display 120cd of the terminal 10cd displays a destination list 1400 listing destination terminals with which the terminal 10cd as the start request terminal may establish a session.

A user of the participation request terminal (terminal 10cb) operates the operation button 108 illustrated in FIG. 2 to select a terminal that has already participated in a session that the user desires to participate in (hereinafter, referred to as a participating terminal) from the destination list 1400. In response to this, the operation input receiving unit 12 accepts the participation request for the contents data session that has been already established (Step S104). Hereinafter, a case where the terminal 10*db* as the participating terminal is selected will be described.

Accordingly, the communication unit 11 of the participation request terminal (terminal 10*cb*) that requests participation transmits the participation request information including the terminal ID "01*cb*" of the participation request terminal (terminal 10*cb*), the change request information "Call" indicating to request to participate in the contents data session, and the terminal ID "01*db*" of the selected participating terminal to the management system 50 (Step S105).

When receiving session participation request information, the management system 50 determines whether to continue a process of connecting the participation request terminal (terminal 10*cb*) with the participating terminals (terminals 10*aa* and 10*db*) participating in the contents data session sed using the destination list management table (FIG. 12) (Step S107). Herein, the process of Step S107 will be described in detail with reference to FIG. 35. FIG. 35 is a processing flow chart illustrating a determining process of participation based on the communication state.

First, the state management unit 53 refers to the terminal management table (FIG. 11), and acquires the Communication state of the participating terminal (terminal 10*db*) using the terminal ID "01*db*" of the selected participating terminal (terminal 10*db*) illustrated in the participation request information as a search key (Step S106-1). Next, the participation determination unit 63 refers to the acquired communication state. When the acquired communication state is other than "Private Busy" (except "Private Busy" in Step S106-2), the process ends as it is.

When the acquired communication state is "Private Busy" ("Private Busy" in Step S106-2) like the embodiment in which the session having participation restriction is established, the participation determination unit 63 prohibits the participation request terminal from participating in the established session (Step S106-4). And the communication unit 11 transmits a notification of participation failure for notifying that the participation in the session is not allowed to the participation request terminal (terminal 10*cd*) (Step S106-5, and Step S109 of FIG. 33). When receiving an error message, the participation request terminal (terminal 10*cd*) displays the error message on the display 120.

Subsequently, a process in which the terminal 10*aa* exits the contents data session after the contents data session is established among the terminals (10*aa*, 10*cb*, and 10*db*) will be described with reference to FIG. 36. FIG. 36 illustrates a process of transmitting/receiving various pieces of management information all by the session for management information sei.

First, a user of the terminal 10*aa* presses the operation button 108 illustrated in FIG. 2, so that an exit request from the contents data session is accepted (Step S121). The communication unit 11 of the terminal 10*aa* transmits exit request information including the terminal ID "01*aa*" of the terminal 10*aa*, change request information "Leave" indicating the exit request from the contents data session, and the session ID "sel" to the management system 50 (Step S122). Hereinafter, a terminal serving as a transmission source of the exit request information is referred to as an exit request terminal.

When receiving the exit request information, the state management unit 53 of the management system 50 changes a field of communication state in a record including the terminal ID "01*aa*" in the terminal management table (refer to FIG. 11) based on the terminal ID "01*aa*" of the terminal 10*aa* included in session exit request information (Step S123).

A process in Step S123 will be described in detail with reference to FIG. 31. Herein, the "relay request terminal" illustrated in FIG. 31 is read as the "exit request terminal". The state management unit 53 illustrated in FIG. 5 acquires the communication state of a terminal managed by the terminal management DB 5003 (Step S123-1). In this case, the change request information "Leave" received by the communication unit 51 is determined not being a specific piece of change request information in advance by the change request information determination unit 61. Based on the above, the state management unit 53 acquires only the communication state of the exit request terminal (terminal 10*aa*). In this case, the state management unit 53 searches the terminal management table (refer to FIG. 11) using the terminal ID "01*aa*" of the terminal 10*aa* as a search key, and acquires the communication state "Private Busy" of the exit request terminal (terminal 10*aa*).

Next, the state management unit 53 acquires state-before-change information corresponding to the change request information "Leave" (Step S123-2). In this case, the state management unit 53 searches the state change management table (refer to FIG. 16) using the change request information "Leave" as a search key, and acquires the state-before-change information "Private Busy".

Next, the state management unit 53 compares the acquired communication state with the state-before-change information to determine whether they are the same (Step S123-3). In this case, the state management unit 53 compares the acquired communication state "Private Busy" with the state-before-change information "Private Busy" of the exit request terminal (terminal 10*aa*) to determine whether they are the same.

When it is determined that the communication state and the state-before-change information of the terminal are the same in Step S123-3 (Yes at Step S123-3), the state management unit 53 acquires the change information corresponding to the change request information "Leave" (Step S123-4). In this case, the state management unit 53 searches the state change management table (refer to FIG. 16) using the change request information "Leave" as a search key, and acquires the change information "None".

Next, the state management unit 53 changes a field of communication state of a record including the terminal ID "01*aa*" in the terminal management table (refer to FIG. 11) based on the terminal ID "01*aa*" of the exit request terminal (terminal 10*aa*) (Step S123-5). In this case, a field of communication state of the record including the terminal ID "01*aa*" of the terminal management table is changed to "None" based on the acquired change information.

When it is determined that the communication state and the state-before-change information of the exit request terminal are not the same in Step S123-3 (No at Step S123-3), the state management unit 53 does not change a field of communication state of the record including the terminal ID "01*aa*" in the terminal management table (refer to FIG. 11). In this case, the error message is transmitted to the exit request terminal (terminal 10*aa*) to complete the process (Step S123-6).

Next, returning back to FIG. 36, a subsequent process to the change of the communication state in Step S123-5 will be described. First, the session management unit 57 deletes the terminal ID "01*aa*" of the terminal 10*aa* from a field of exit request terminal of a record including the session XD "sel" in the session management table (refer to FIG. 13) of the non-volatile storage unit 5000 (Step S124). The management system 50 transmits the exit request of the session to the relay device 30e (Step S125). The exit request is a notification of requesting exit from the session, and includes the terminal ID "01aa" of the exit request terminal (terminal 10aa) and the session ID "sel". Accordingly, the relay device 30e stops the contents data session between the relay device 30e and the terminal 10aa, and disconnects the connection with respect to the terminal 10aa. Subsequently, the relay device 30e transmits an exit permission of the session to the management system 50 (Step S126). The exit permission is a notification of permitting the exit request, and includes the terminal ID "01aa" of the exit request terminal (terminal 10aa) and the session ID "sel".

When the management system 50 receives the notification of permitting the exit request, the communication unit 51 transmits session exit permission information including the terminal ID "01aa" of the exit request terminal (terminal 10aa), the change request information "Leave", the session ID "set", and the notification information "OK" indicating to permit the exit request to the terminal 10aa (Step S127). When receiving the session exit permission information, the exit request terminal (terminal 10aa) accepts the request of "power OFF" by pressing the power switch 109 illustrated in FIG. 2 (Step S128). When the request of "power OFF" is accepted, the communication unit 11 transmits disconnect request information including the terminal ID "01aa" of the exit request terminal (terminal 10aa) and the notification information indicating to disconnect the connection with respect to the management system 50, to the management system 50 (Step S129).

When the communication unit 51 of the management system 50 receives the disconnect request information, the state management unit 53 deletes a record of a field of communication state of the record including the terminal ID "01aa" in the terminal management table (refer to FIG. 11) based on the terminal ID "01aa" of the exit request terminal (terminal 10aa) included in the disconnect request information (Step S130). Subsequently, the communication unit 51 transmits disconnect permission information indicating to permit the disconnect request to the exit request terminal (terminal 10aa) (Step S131). Accordingly, the management system 50 stops a session for management data between the management system 50 and the exit request terminal (terminal 10aa), and disconnects the connection with respect to the exit request terminal (terminal 10aa).

When receiving the disconnect permission information, the exit request terminal (terminal 10aa) executes "power OFF" to complete the process (Step S132). Similarly to the processes in Steps S121 to S132 of the exit request terminal (terminal 10aa), the terminal 10cb and the terminal 10db may also exit from the contents data session sed to complete a call between the terminals.

As described above, according to the embodiment, the communication unit 51 of the management system 50 accepts the request to participate in the session from a third terminal (terminal 10cb) when a session that transmits the contents data is established between a first terminal (terminal 10aa) and a second terminal (terminal 10db). When the established session is a session having participation restriction, the participation determination unit 63 prohibits the third terminal from participating in the session. Accordingly, the management system 50 can restrict midway participation in a session used for a conference involving exchange of highly confidential information and the like.

The management system 50 performs control of connecting the first terminal (terminal 10aa), the second terminal (terminal 10db), and the third terminal (terminal 10cb). In this case, the communication unit 51 transmits, to the third terminal, the relay device connection information for connecting to the relay device 30e that relays the contents data transmitted from the first terminal to the second terminal. Accordingly, the third terminal can be connected to the relay device 30e using the relay device connection information.

As described with reference to FIG. 33, in the above-described embodiment, the terminal 10cd as a participation request terminal selects, from the destination list, a terminal participating in the contents data session having participation restriction to request to participate in, transmits the participation request information to the management system 50, and the management system 50 determines whether to allow the participation. However, it is preferred that the participation determination unit (not illustrated) is provided on the terminal 10cd side and the participation determination unit of the terminal 10cd determines whether to allow the participation.

In this case, in Step S104 of FIG. 33, when the terminal 10cd accepts the participation request in the contents data session that has been already established from a user, the participation determination unit of the terminal 10cd executes the participation determining process.

FIG. 37 is a flow chart illustrating a procedure of the participation determining process performed by the terminal 10cd. Similarly to the above embodiment, in the modification, an operating state of the start request terminal participating in the contents data session having participation restriction is "ON-line (communicating)", and the communication state thereof is "Private Busy". Similarly to the above embodiment, the operating state and the communication state of the start request terminal are received in advance in Steps S37-1 and S37-2 of FIG. 22, and they are displayed on the destination list illustrated in FIG. 34 as icons corresponding to the operating state and the communication state. More specifically, in the start request terminal, an icon corresponding to "ON-line (communicating)" is displayed on the destination list.

When the terminal 10cd selects the destination terminal that has already participated in a session that a user desires to participate in (hereinafter, referred to as a participating terminal) by a user in the destination list of FIG. 34 (Step S101 of FIG. 33), the participation determination unit accepts the selection (Step S104-1). The communication state of the selected participating terminal is confirmed by the destination list (Step S104-2).

When the communication state is "OFF-line" (Step S104-2: OFF-line), the communication unit 11 does not transmit the participation request information to the management system 50 (Step S104-3).

When the communication state is "ON-line (in a call)" (Step S104-2: ON-line (in a call)), the participation determination unit determines that the session has participation restriction, and the communication unit 11 does not transmit the participation request information to the management system 50 and displays a message indicating that the terminal is in a call and cannot make a call on the display 120 (Step S104-4).

FIG. 38 is a diagram illustrating an example of a display screen indicating a message that a call cannot be made. Accordingly, a user can recognize that the session that the user desires to participate in has participation restriction.

When the communication state is "ON-line (call-capable)" (Step S104-2: ON-line (call-capable)), the participation determination unit determines that the session does not have participation restriction, and the communication unit 11 transmits the participation request information to the management system 50 so as to make a call to the requesting source terminal (Step S104-5).

As described above, in the embodiment, the participation determination unit (not illustrated) is provided on the terminal 10cd side, the participation determination unit of the terminal 10cd determines whether to allow the participation. When there is participation restriction, the participation request information is not transmitted to the management system 50, so that a processing load of the management system 50 can be further reduced.

For example, in the above embodiment, the operating state of the participating terminal that is participating in a session having participation restriction may be changed to "OFF-line" and displayed on a destination list and the like to conceal that the session has participation restriction.

However, the terminal participating in a participant-restricted conference is displayed as "OFF-line", a state where displayed destinations are all "OFF-line" is possibly continued. In such a case, a user can hardly discriminate whether the "OFF-line" is caused by malfunction of the system itself or the "OFF-line" is caused since the terminal is always in a call, so that there is a risk of unnecessary misunderstanding.

In addition, the user can hardly discriminate whether the terminal that the user desires to connect is OFF-line because the conference is carried out in a session having participation restriction or simply because the terminal is not connected to the service.

Accordingly, the user can hardly cope with the problem such as to wait until the conference in such a session is finished, or to request to a system manager and the like for connecting the terminal that the user desires to connect to the service.

Therefore, in the embodiment, the terminal participating in a session of a participant-restricted conference having participation restriction is displayed on the destination list as in the operating state and the communication state of "ON-line (in a call)". As illustrated in FIG. 38, when selecting the terminal, the user is notified of not being capable of transmitting the participation request information. As a result, the user can clearly discriminate that the terminal selected in the destination list is a terminal participating in a session of a participant-restricted conference having participation restriction.

Although the present invention has been described hereinabove with reference to the embodiment, various modifications or improvements may be added to the embodiment.

Supplement to Embodiment

In the above embodiment, the terminal ID for identifying the terminal 10 may be replaced with a user ID for identifying a user of the terminal 10, as necessary. In this case, the management system 50 accepts a login request by the user ID instead of the terminal ID (Step S22), and manages the user ID instead of the terminal ID in subsequent processes.

The management system 50 and the program providing system 90 in each of the above embodiments may be constructed by a single computer or may be constructed by a plurality of computers that are arbitrarily allocated by dividing respective parts (a function or a unit). When the program providing system 90 is constructed by a single computer, a computer program transmitted by the program providing system 90 may be transmitted being divided into a plurality of modules or not being divided. When the program providing system 90 is constructed by a plurality of computers, the program may be transmitted from each of the computers being divided into a plurality of modules.

A storage medium in which the terminal program, the relay device program, and the transmission management program of the embodiment are stored, the HD 204 in which these programs are stored, and the program providing system 90 including the HD 204 are used as program products when the terminal program, the relay device program, and the transmission management program are provided to a user and the like in a country or outside a country.

In the above embodiment, by way of example, quality of the image data relayed by the relay device 30 is managed focusing on resolution of an image of the image data by the changed quality management table illustrated in FIG. 7 and the quality management table illustrated in FIG. 14. However, the present invention is not limited thereto. Other examples of the quality that is focused on and managed may include a depth of image quality of the image data, sampling frequency of a voice of the audio data, and a bit length of a voice of the audio data.

The relay device management table illustrated in FIG. 9, the terminal management table illustrated in FIG. 11, and the session management table illustrated in FIG. 13 manage a date of reception, however, the present invention is not limited thereto. At least a time of reception may be managed of the date of reception.

In the above embodiment, the relay device management table illustrated in FIG. 9 manages the IP address of the relay device and the terminal management table illustrated in FIG. 11 manages the IP address of the terminal. However, the present invention is not limited thereto. Alternatively, relay device specifying information for specifying the relay device 30 on the communication network 2 or terminal specifying information for specifying the terminal 10 on the communication network 2 may manage each fully qualified domain name (FQDN). In this case, an IP address corresponding to the FQDN is acquired by a well-known domain name system (DNS) server. The "relay device specifying information for specifying the relay device 30 on the communication network 2" may be alternatively expressed as "relay device connection destination information indicating a connection destination of the relay device 30 on the communication network 2" or "relay device destination information indicating a destination of the relay device 30 on the communication network 2". Similarly, the "terminal specifying information for specifying the terminal 10 on the communication network 2" may be alternatively expressed as "terminal connection destination information indicating the connection destination of the terminal 10 on the communication network 2" or "terminal destination information indicating a destination of the terminal 10 on the communication network 2".

In the embodiment, the "television conference" is used as an interchangeable term with a "video conference".

In the above embodiment, a television conference system is described as an example of the transmission system 1. However, the present invention is not limited thereto. The transmission system 1 may be a telephone system such as an Internet Protocol (IP) telephone or an Internet telephone. The transmission system 1 may also be a car navigation system. In this case, for example, one terminal 10 corresponds to a car navigation device mounted on a car, and the other terminal 10 corresponds to a management terminal or a management server of a management center that manages car navigation, or a car navigation device mounted on another car. In addition, the transmission system 1 may be an audio teleconference system or a personal computer (PC) screen sharing system.

The transmission system 1 may also be a communication system of a mobile phone. In this case, for example, the terminal 10 corresponds to the mobile phone. An example of displaying the destination list in this case is illustrated in FIG.

Figure 39:
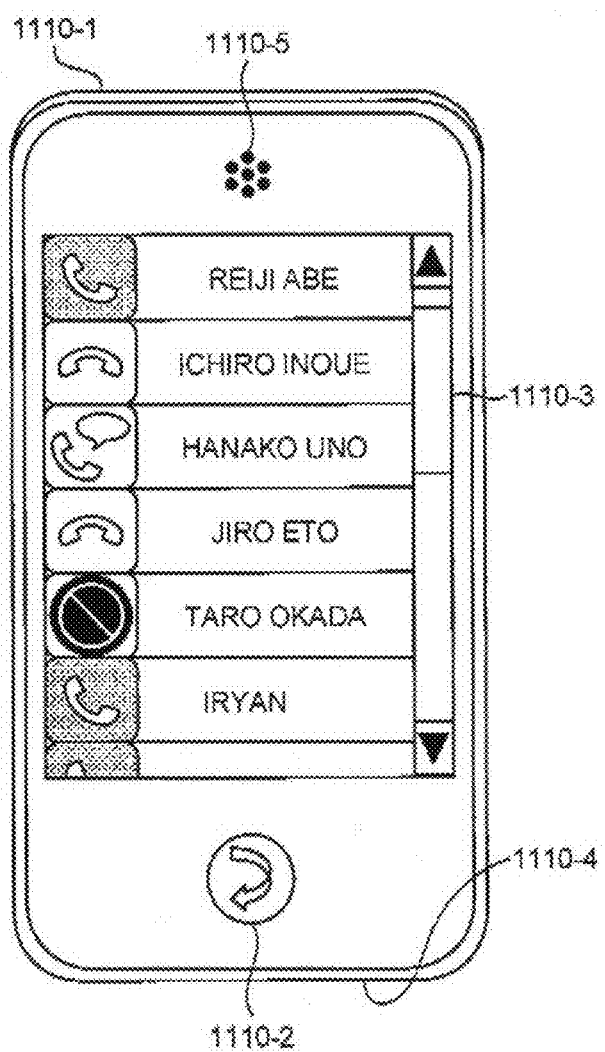
FIG. 39 is a conceptual diagram illustrating a destination list of another embodiment.

39. FIG. 39 is a conceptual diagram illustrating a destination list of another embodiment. That is, the terminal 10 as the mobile phone includes a main body 1110-1 of the mobile phone, a menu screen display button 1110-2 provided to the main body 1110-1, a display unit 1110-3 provided to the main body 1110-1, a microphone 1110-4 provided to a lower part of the main body 1110-1, and a speaker 1110-5 provided to the main body 1110-1. Among these, the "menu screen display button" 1110-2 is a button for displaying a menu screen on which icons indicating various applications are displayed. The display unit 1110-3 is a touch panel. When a user selects a destination name, a call can be made with a partner mobile phone.

In the above embodiment, the image data and the audio data are described as an example of the contents data. However, the present invention is not limited thereto. The contents data may be tactile (touch) data. In this case, a feeling of touch by a user on one terminal side is transmitted to the other terminal side. The contents data may be olfactory (smell) data. In this case, a smell (odor) on one terminal side is transmitted to the other terminal side. The contents data may be at least one of the image data, the audio data, the tactile data, and the olfactory data.

In the above embodiment, a case where the transmission system 1 is used to carry out the television conference has been described. However, the present invention is not limited thereto. The transmission system 1 may be used for a meeting, a general conversation among family members or friends, or unidirectional presentation of information.

According to the embodiment, it is possible to provide an effect of easily and appropriately limiting terminals that can participate in communication.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A transmission terminal connected to a management device via a network, the transmission terminal comprising:
processing circuitry configured to
transmit, to the management device, a request for retrieving communication state information of one of a first transmission terminal and a second transmission terminal, wherein the first and second transmission terminals are different from the transmission terminal, and the first terminal is in an established communication system session with the second terminal, which is indicated by the communication state information,
acquire the communication state information of the one of the first transmission terminal and the second transmission terminal from the management device;
determine that it is not allowable to participate in the established session when the communication state information of the one of the first transmission terminal and the second transmission terminal indicates a participation restriction; and
determine to not transmit a participation request to the management device when it is determined that the participation is not allowable.

2. The transmission terminal according to claim 1, wherein the processing circuitry is further configured to notify that the participation is not allowable when it is determined that the participation is not allowable.

3. The transmission terminal according to claim 1, further comprising a display configured to display a message indicating that a call cannot be made to the one of the first transmission terminal and the second transmission terminal when the processing circuitry determines that the participation is not allowable.

4. The transmission terminal of claim 1, wherein the processing circuitry is configured to determine that it is not allowable to participate in the established session when the communication state information indicates a private-busy communication state.

5. A communication system, comprising:
a management device; and
a non-transitory computer-readable storage medium with an executable program stored thereon to be executed by processing circuitry of a transmission terminal connected to the management device via a network, wherein the program instructs the computer to perform
transmitting, to the management device, a request for retrieving communication state information of one of a first transmission terminal and a second transmission terminal, wherein the first and second transmission terminals are different from the transmission terminal, and the first terminal is in an established communication system session with the second terminal, which is indicated by the communication state information,
acquiring the communication state information of the one of the first transmission terminal and the second transmission terminal from the management device;
determining that it is not allowable to participate in the established session when the communication state information of the one of the first transmission terminal and the second transmission terminal indicates a participation restriction; and
determining to not transmit a participation request to the management device when it is determined that the participation is not allowable.

6. A non-transitory computer-readable storage medium with an executable program stored thereon to be executed by processing circuitry of a transmission terminal connected to the management device via a network, wherein the program instructs the computer to perform a method comprising:
transmitting, to the management device, a request for retrieving communication state information of one of a first transmission terminal and a second transmission terminal, wherein the first and second transmission terminals are different from the transmission terminal, and the first terminal is in an established communication system session with the second terminal, which is indicated by the communication state information,
acquiring the communication state information of the one of the first transmission terminal and the second transmission terminal from the management device;
determining that it is not allowable to participate in the established session when the communication state information of the one of the first transmission terminal and the second transmission terminal indicates a participation restriction; and
determining to not transmit a participation request to the management device when it is determined that the participation is not allowable.

7. A communication system, comprising:
a plurality of terminals including a first terminal, a second terminal, and a third terminal;

processing circuitry configured to
- acquire start request information for requesting start of a session between the first terminal and the second terminal, the start request information including designation that there is a participation restriction of a terminal other than the first terminal and the second terminal with respect to the session,
- establish the session between the first terminal and the second terminal according to the start request information,
- acquire participation request information for requesting participation of the third terminal in the established session that has been already established between the first terminal and the second terminal, and prohibit the third terminal from participating in the established session in response to the acquisition of the participation request information when the start request information designates the participation restriction.

8. The communication system according to claim 7, wherein the processing circuitry is further configured to notify the third terminal of a participation failure when the start request information designates the participation restriction.

* * * * *